US008611673B2

(12) United States Patent
Aarabi et al.

(10) Patent No.: US 8,611,673 B2
(45) Date of Patent: Dec. 17, 2013

(54) METHOD, SYSTEM AND COMPUTER PROGRAM FOR INTERACTIVE SPATIAL LINK-BASED IMAGE SEARCHING, SORTING AND/OR DISPLAYING

(76) Inventors: Parham Aarabi, Toronto (CA); Ron Appel, Toronto (CA)

( * ) Notice: Subject to any disclaimer, the term of this patent is extended or adjusted under 35 U.S.C. 154(b) by 1130 days.

(21) Appl. No.: 11/520,680

(22) Filed: Sep. 14, 2006

(65) Prior Publication Data

US 2008/0069480 A1     Mar. 20, 2008

(51) Int. Cl.
*G06K 9/62* (2006.01)
(52) U.S. Cl.
USPC ............ 382/209; 382/291; 382/195; 382/220
(58) Field of Classification Search
None
See application file for complete search history.

(56) References Cited

PUBLICATIONS

Linda Shapiro & George Stockman, Computer Vision, Prentice Hall 2001.*

(Paul Kwan et al, Connecting Image Similarity Retrieval with Consistent Labeling Problem by introducing a Match-all label, IEEE 2001.*
Y. Alp Aslandogan et al, Techniques and Systems for Image and Video Retrieval, IEEE 1999.*
Ricardo S. Torres et al, Visual Structures for Image Browsing, ACM 2003.*
H. C. van Assen et al, Accurate Object Localization in Gray Level lamges Using the Center of Gravity Measure: Accuracy Versus Precision, IEEE 2002.*
Lei Zhang et al, Efficient Propagation for Face Annotation in Family Albums, ACM 2004.*

* cited by examiner

*Primary Examiner* — Chan S Park
*Assistant Examiner* — Mark Roz
(74) *Attorney, Agent, or Firm* — Miller Thomson LLP; Eugene Gierczak

(57) ABSTRACT

A web-based application provides more accurate and clearer methods of searching, sorting, and displaying a set of images stored in a database. A first aspect of the present invention is the method by which image data is stored. Typical content-based systems use color information, whereas the present invention uses an image-location tagging method. A second aspect of the present invention is the method by which the set of images are sorted in relevancy. Tag data of the images allows for a new and fast method of searching through an entire set. A third aspect of the present invention is the method by which the sorted images are displayed to the user. Instead of the common method of just displaying the images in a rectangular array, where each image is the same size, the web-based application positions and sizes each image based on how relevant it is.

32 Claims, 23 Drawing Sheets

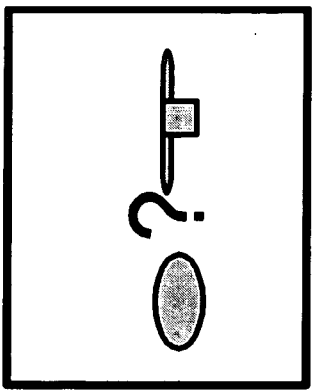
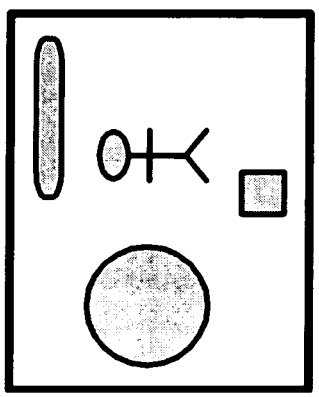
Fig. 6

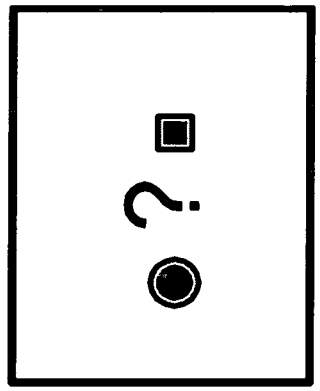
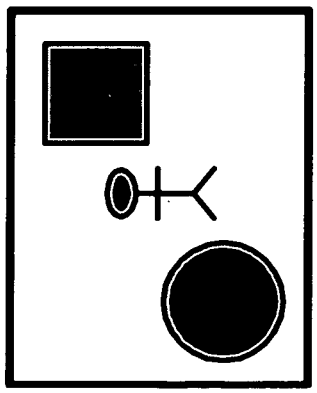
Fig. 7

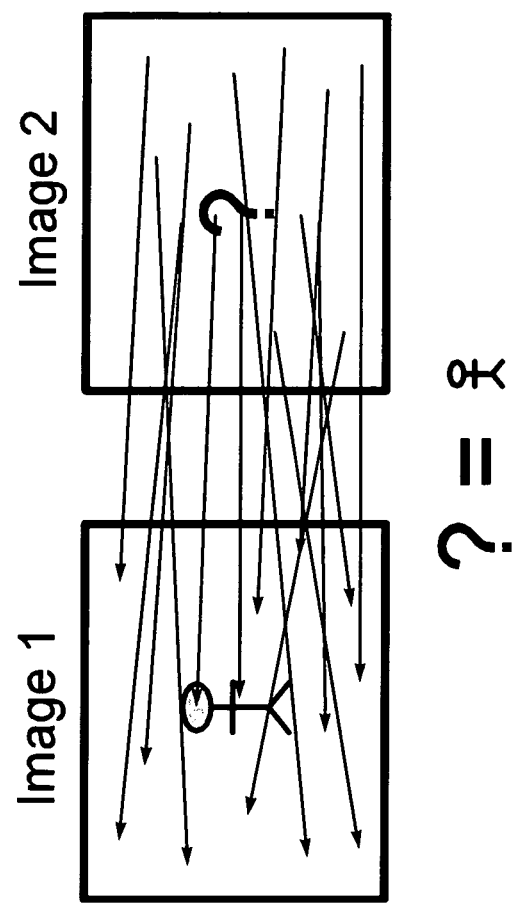

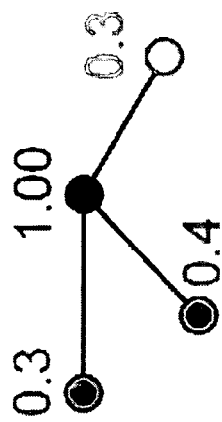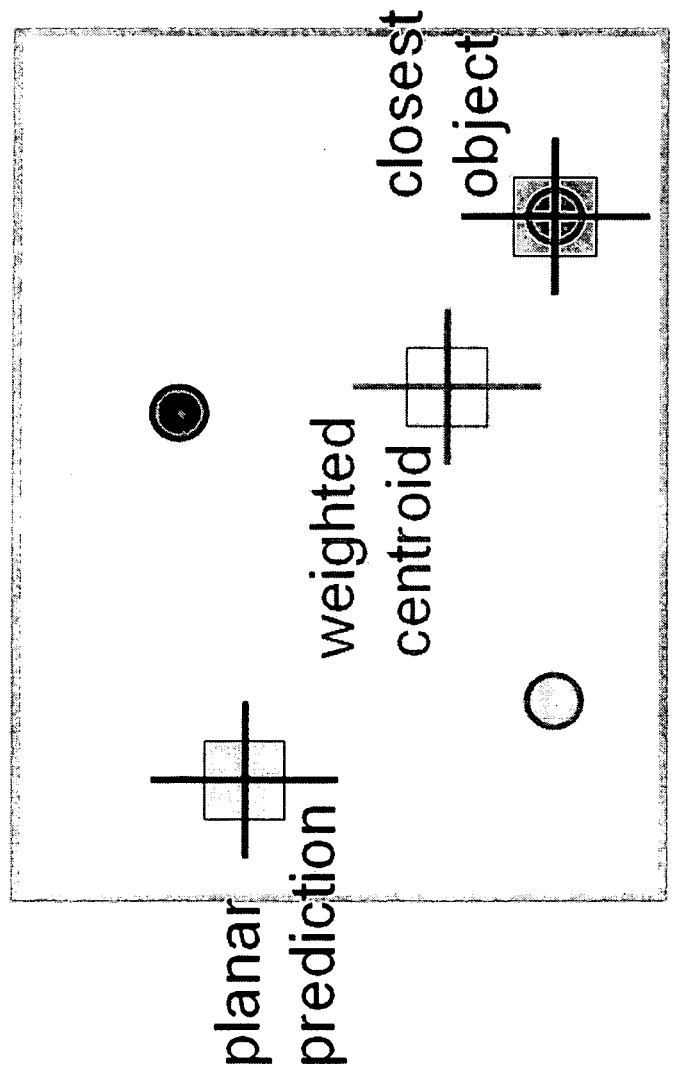
Fig. 10

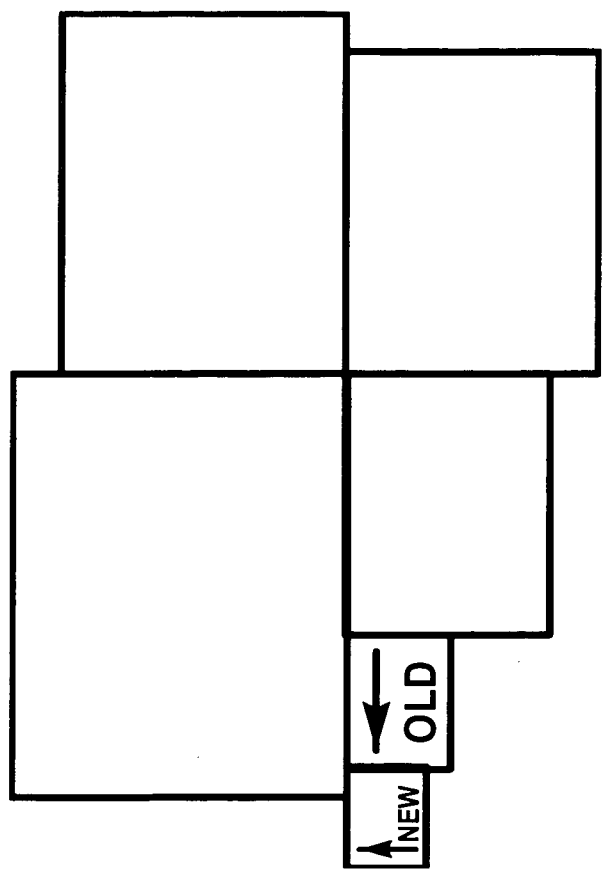

METHOD, SYSTEM AND COMPUTER PROGRAM FOR INTERACTIVE SPATIAL LINK-BASED IMAGE SEARCHING, SORTING AND/OR DISPLAYING

FIELD OF THE INVENTION

The present invention relates to the field of searching, sorting and/or displaying images.

BACKGROUND OF THE INVENTION

With the advent of the digital camera, and now with the highly competitive market in which many companies such as CANON™, SONY™ and NIKON™ have a mass of models for sale to the general public at very affordable prices, a very large number of people that own a computer also own a digital camera. Largely due to this, a blooming area in web-based utilities is the online storage of personal photo albums.

Existing applications such as YAHOO!™ Photos and FLICKR™ allow users to upload their images onto a remote database, thereby saving space by not having to store them locally. However, these online databases must not only store the photographs, they must also be able to display them, and provide some methods of searching and sorting through them.

Present methods of image searching include content-based scans such as color pattern recognition and histogram statistics. Although research is currently being conducted into this field, these types of searches are not very accurate, and will not be perfected for many years to come.

Furthermore, the image display organization of many of these existing web applications is confusing, and does not clearly denote an order in the images, namely there is no clear definition of which image is more relevant than the others.

Numerous methods for searching, sorting, and displaying images have been proposed over the years [1-18]. (References to background documents indicated by Arabic numbers in square brackets refer to one or more of the references cited in the "List of References" below.) The methods and systems of searching images can be generally divided into content-based and tag-based categories. Content-based image searching/retrieval systems have the benefit of being mostly automatic (requiring little or no user tagging) with the ability to search virtually any image based on what it contains [1-9]. Yet, they suffer from the problem of requiring extensive computations for the search, making a real-time implementation on a large-scale image database expensive. Furthermore, content-based systems often result in inaccurate search results due to the misrecognition of the contents of the image, thereby resulting in frustrated system users and a perception of unreliability. While a variety of modifications to classic content-based image search have been proposed over the years, such as user feedback and sub-image analysis [10], the level of reliability of these systems for general applications have not been increased to the point of wide-spread user acceptance.

An alternative and more successful method, such as the one implemented on websites such as FLICKR™, is to manually tag or describe the contents of an image, and then to search these images by searching the tags or descriptions of the images [11,12]. Tag-based methods have the advantage of being reasonably reliable (as long as the people tagging can be trusted) while requiring very simple computations (as compared to content-based approaches). However, tagging images requires significant time and effort to be spent by the user especially for large image databases. Furthermore, tag-based approaches are unable to identify the specific location of the object being searched within an image; all they can do is to identify whether the object exists in the image or not.

Many methods for searching, sorting, or tagging images have been patented. One example is a patent that provides a method and apparatus for assigning keywords to objects found within images, as well as video and audio files [4]. These keywords can be assigned to file names or URLs of images. Images can also be described by the text in the link, including headings and titles, captions, or ALT text HTML tags used to annotate images. Images can thus be searched through these descriptions or "tags". This method of searching takes into account the fact that not all captions found within the URL are useful or relevant to specific images, and thus it only tags images using the text found closest to them. It also determines whether any words in the text match the name assigned to the image, thus text that matches is given higher priority as a tag. This method can only be successful if the images are carefully named or described within their URL. However, it cannot locate specific objects within images, or images themselves if they have not been appropriately described by the user.

A lot of related patents use image processing to search for images. An "automatic person meta-data labeler" offers a method of labeling objects within images, and does so by detecting their distinctive colors [18]. It is useful for the prioritization and sorting of images as well as for identifying a designated person that appears in a group of images. It can be used to automatically label images by detecting particular patters and colors, such as a piece of jewelry that a person is wearing in all images, or their skin tone. As useful as this is for labeling pictures within certain albums or groups of images taken of one scene from different angles, it may not be useful for pictures taken on different days or of various sceneries. It also may require a lot of computational ability, and may take a long time to process and label large groups of images.

Another similar patent provides a method for the searching of images according to queries containing visual attributes of images, including color, texture, shape, and size [2]. These queries also contain textual tags attached to images. This is useful in retrieving images, by entering their visual or textual attributes, and searching the query. It is especially effective in searching for images by queries based on pixel information of contained images.

This type of image search is also carried out by a patent that provides an indexing method for accelerating a content-based image search [3]. It can identify the most similar images by analyzing their color, texture, shape, or content, and generating and storing index values.

Color is a common attribute used to define images, and most methods use it to search for images. One patent provides this type of method of image searching by using a multilevel image grid data structure of different hierarchical levels with respect to one color in an image [15]. These grid color levels are compared and matched, grouping similar images.

Another method allows an image search by using a histogram, comprised of bins [17]. For example, a histogram of each image in a database is created using its color information, in order of importance. If a particular color appears in a lot of images, it is given a low priority, and placed at the end of the chart. Similarly, a less common color would be given high priority and positioned at the beginning of a chart. Therefore, images that contain less frequent colors will be more distinguishable and would thus be effective bins to use.

Other methods of searching that have been implemented to break images down into segments. One example is a patent that involves searching for and localizing an object within an image, by breaking it down into a number of geometric submodels [5]. Geometric descriptions of objects can then be specified in some coordinate system, which enables object localization for a broad range of imaging conditions. This is an efficient method both in memory and computational time.

Another method segments images into regions to which weights are assigned, and calculates the similarity between images by comparison of set weights [13]. The weights are calculated by comparing feature similarities for each region in a plurality of images. It is thus a useful method for searching for similar images.

Another patented system can be used to search for images by storing codes in a database [14]. For example, it stores facial codes which define facial features in each image into a database, linking them to corresponding images, instead of storing whole images themselves. This allows for image searching, while reducing the amount of necessary storage, making this a fast and efficient method.

These methods can all be extended to further applications, such as video and audio searches. One example of a previously implemented apparatus is one developed for the application of a surveillance camera system. This apparatus searches for a desired image through a set of images recorded by the camera, using the difference in luminance information between the reference and the other recorded images [16].

What is needed therefore is novel methods and systems for searching, sorting, and/or displaying a set of images stored in a database that overcomes the limitations of the prior art.

SUMMARY OF THE INVENTION

In one aspect of the present invention, a point of an image associated with an object is assigned a tag. If the same object appears in two different images, it is assigned the same tag and so the two points corresponding to this object in the different images are linked through the tag. This link structure allows for an efficient registration of images within a database.

In another aspect of the present invention, a new method of image searching and sorting is provided. According to this aspect, a search is initiated when a user selects a certain location on an image. The method utilizes one or more interpolation techniques to search for the object corresponding to the location selected by the user. These object localization and searching techniques apply to fully specified or partially specified tagging/linked images.

In another aspect of the present invention, an image ranking and localization algorithm consists of building a graphical representation of the link structure for the images and then utilizing graphical methods in order to find the respective weights of all link points for a given initial selection. Those weights can then be used to find the rank of an image (the sum of the weights for that respective image) and the location of the image (the centroid of the weights for that respective image). Although this centroid-based location estimate is the preferred localization technique, an alternative non-weighted or weighted planar prediction technique can be used in accordance with the present invention.

In yet another aspect of the present invention, an image display interface is provided. A set of images are sorted based on relevance as determined by ranking methods. They are displayed according to a number of techniques, including: (i) the more relevant the image is, the larger it appears relative to other images; (ii) the more relevant the image is, the closer it is placed to the most relevant image in the image set; and (iii) images are displayed in as small a size as possible to minimize the user's eye and pointer movement when browsing images. The display of images is determined in accordance with a display packing algorithm.

According to one embodiment, a web-based application provides an image display interface with tagging and linking functionality. The interface provides for the creation of new tags and links and provides visual representations of the links formed between images. Image display effects optimize the ease of use.

According to a particular preferred embodiment, a system application having a web-based interface allows users to search, sort and display digital images. Preferably, a user is required to register and login before they are granted access to the system. The system allows users to upload images and access the images according to a tag mode, a view mode and an organizer mode. The system enables image sharing between friends.

It should be understood that the present invention is directed at searching, sorting and/or displaying images but can be implemented in the same manner to searching, sorting and/or displaying other content, including but not limited to videos, audio, external links, as well as other media where a link between different entities can be drawn.

BRIEF DESCRIPTION OF THE DRAWINGS

A detailed description of the preferred embodiments is provided herein below by way of example only and with reference to the following drawings, in which:

FIG. 6 is an illustration of geometric interpolation.

FIG. 7 is an illustration of relative locality interpolation.

FIG. 8 is an illustration of large-scale-link interpolation.

FIG. 10 illustrates an example of localization estimates.

FIGS. 15A, 15B, 15C and 15D illustrate an example of the placement of images on an interface in accordance with an aspect of the present invention.

Figure 1:
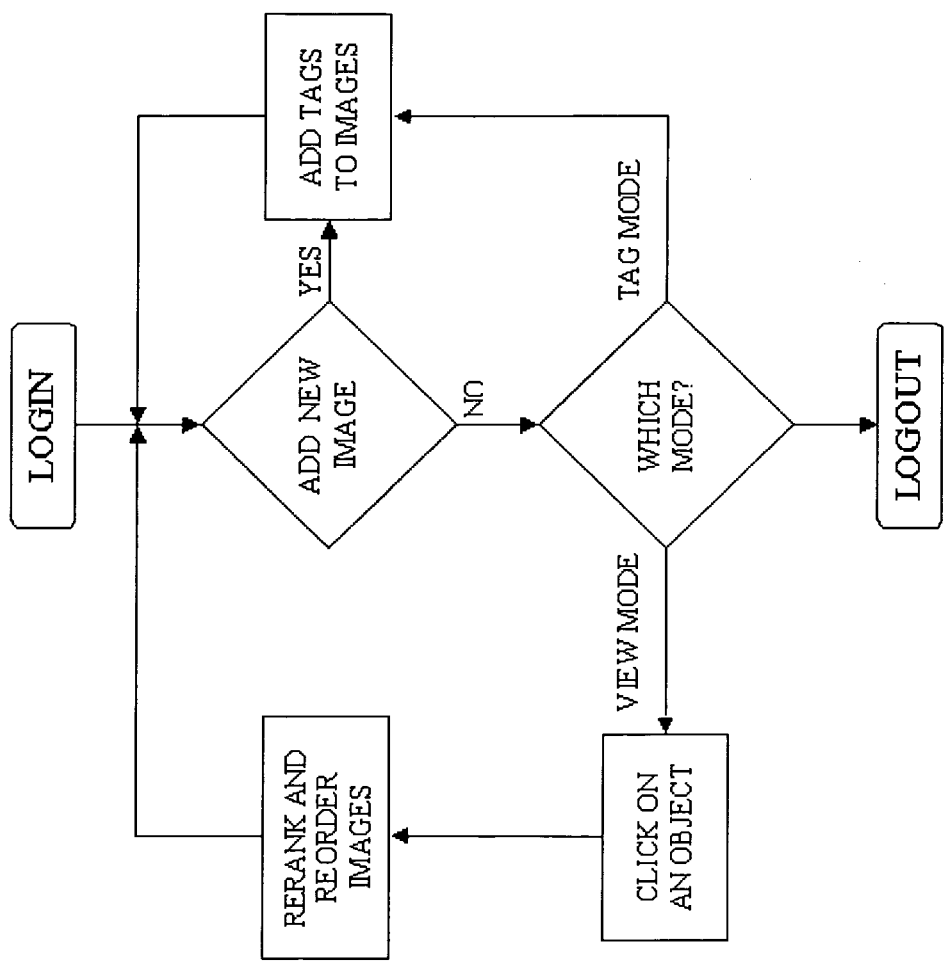
FIG. 1 illustrates a flow diagram of a user interface in accordance with an aspect of the present invention.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

One aspect of the present invention consists of an interactive spatial link-based method, system and computer program for searching, sorting and/or displaying digital images. According to this aspect, images are partially tagged and the relational and positional information of the tags are utilized in order to search for untagged and unidentified objects without performing content analysis. By anchoring each tag at a specific location within an image, a specific point in several images is associated to a single unique tag. In other words, linking points in several images together indicates the presence of a particular object.

By having several such link points in every image, it becomes possible to construct a graphical or circuit representation of the objects by utilizing the distance between the link points as a measure of the resistance between those points. Now, if a user wants to search for a particular linked or unlinked object, all he or she has to do is to click on a specific location within any image. By doing so, the click at the location can be modeled as the introduction of a voltage source at a particular set of points within the circuit/graphical representation of the links.

By propagating the voltages across the nodes of the network (using a circuit-like potential propagation algorithm), it becomes possible to rank the relevance of each image to the object being searched for, as well as to roughly localize the object selected within each image. In other words, the user clicks on any location within an image and the system automatically finds other views of that object in other images with only minimal initial user tagging of the images. This approach significantly differs from the prior art in this area by its utilization of location-based tags combined with a novel image ranking and object localization methodology whose basis is rooted in graph theory.

Image Tags

Image Tagging

Aside from the conventional image data stored and accessed as pixel colors, applications such as YAHOO!™ Photos and FLICKR™ use uni-tags, which contain long descriptions about an image without associating parts of that description with specific locations in the image. However, the present invention, which uses location-based tagging and linking, allows for a more descriptive explanation of an image as compared to these uni-tags.

Often, with images containing multiple objects, the tags that explain and describe the contents of the image belong to one or more locations within the image. For example, in an image that contains a satellite photograph of a scene, several buildings may be contained that can be individually tagged based on their locations. Similarly, for photo albums that may contain multiple individuals, each person can be individually identified through a separate tag.

The present invention uses a tag structure, in which points on a specific image are assigned specific tags. If the same object appears in two different images, it is assigned the same tag in both images, and so the two points corresponding to this object in the different images are hyperlinked through the tag. This hyperlink structure is illustrated as a flowchart in FIG. 1.

It is important to note that these links are image-location specific, meaning that they link a specific location (i.e. approximate x-y position) of an image to a specific location of another image. Furthermore, while the links here can either be bi-directional or uni-directional, the general discussion focuses on bi-directional links. (In other words, although in some images there may be a uni-directional arrow, this is only for illustrative purposes and the actual link is meant to be bi-directional.)

Figure 2:
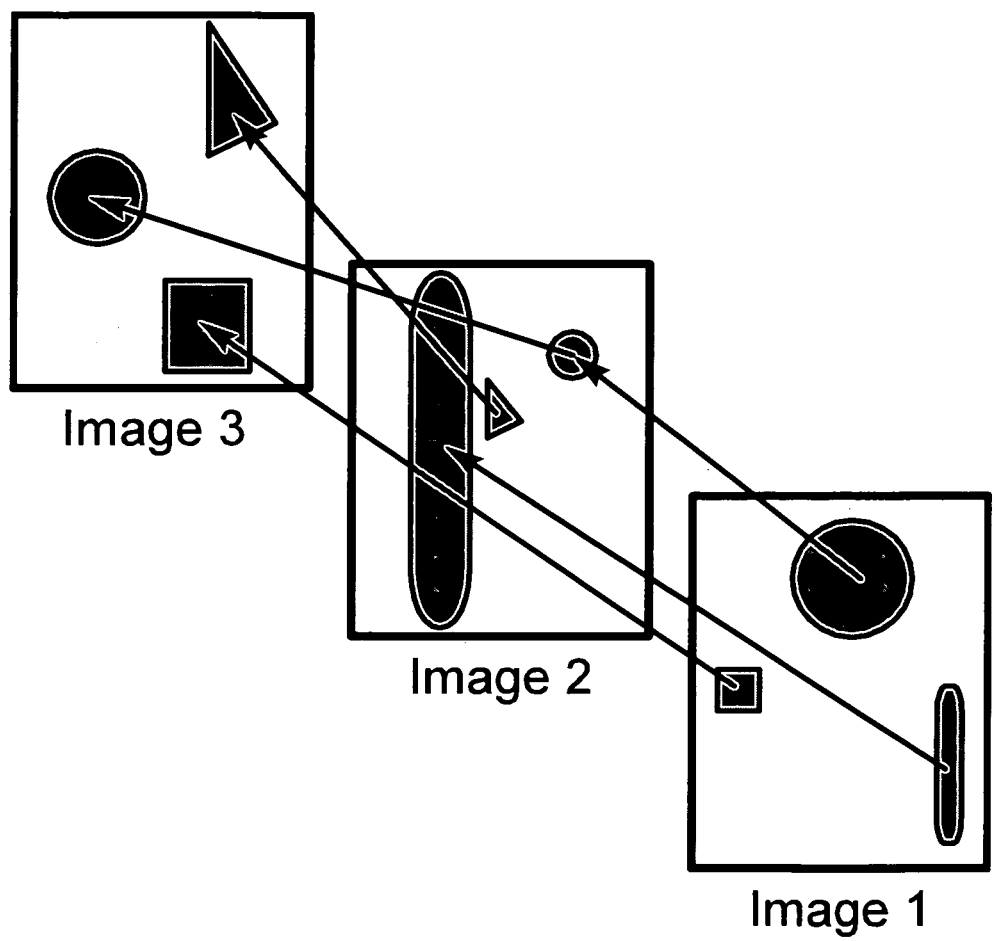
FIG. 2 illustrates a simple set of images with recurring objects (circle, square, etc.).

As shown in FIG. 2, each of the important objects in image 1 are linked to the objects of image 2 or image 3, or both. For example, since the circle appears in all three images it is linked across all three images, while the square only appears in images 1 and 3 and therefore there is only a single link for it, bypassing image 2. In practice, these link structures must be manually obtained for a database of images, or they could be automatically obtained by conducting a sub-image matching operation, which finds similar objects and links them together.

Image Registration

Figure 3:
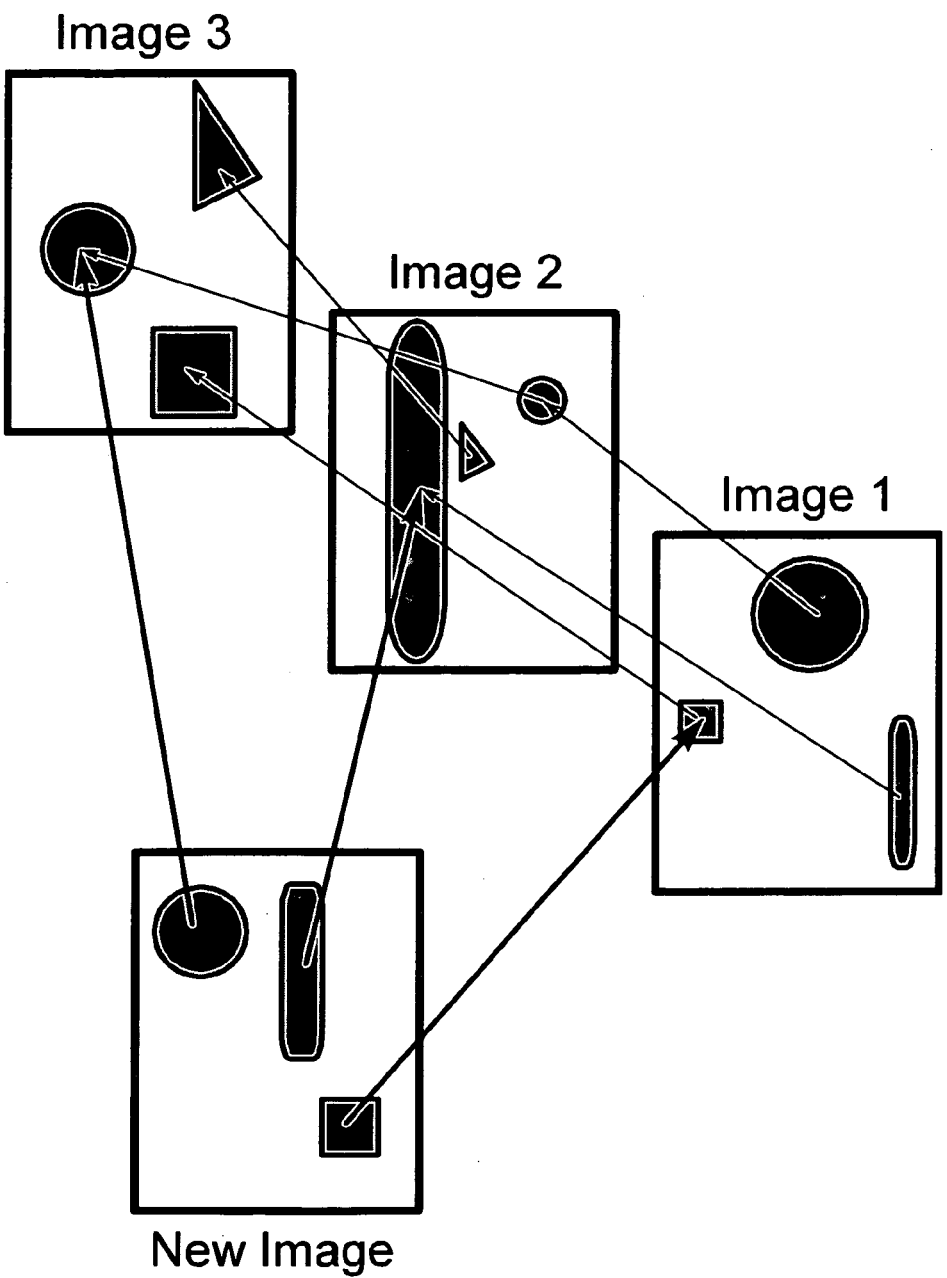
FIG. 3 illustrates insertion of a new image into the existing set.

The presented link structure could easily accommodate an expansion or extension to the database. If a new image is uploaded or added to the database, all that must be done (again, manually or automatically) is to link some of the important objects in the new image to those of other images in the database. By doing so, as shown in FIG. 3, the new image is very easily registered in the database. After that point, this new image can be treated in every way as one of the database images.

The efficiency in the registration of images for this presented system is highly advantageous. Image registration can be performed even with a novice user quite easily, since all that is required is a set of simple linking operations. In terms of the web-based application, this is accomplished through a single mouse drag starting at the first point in the first image, and ending at the second point in the new image.

Tagging and Linking Interface

Figure 4:
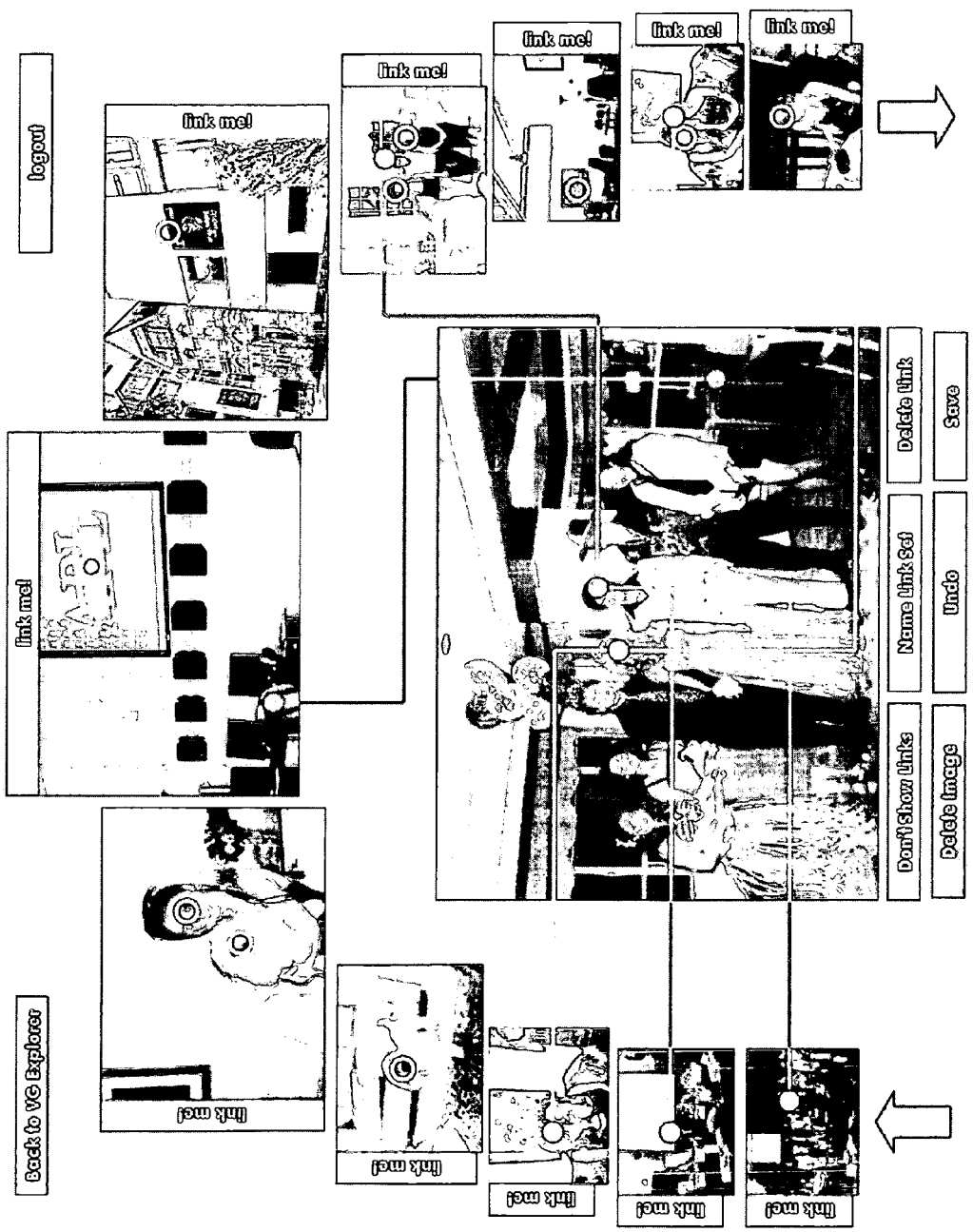
FIG. 4 is an illustration of the visual presentation of an image linking system.
Figure 5:
FIG. 5 illustrates a suggested linking interface, allowing for any image to be linked.

In terms of the web-based application through which all of the back-end image tagging is performed, various interfaces have been put together. FIGS. 4 and 5 illustrate computer-based examples of such interfaces, and both aim to be extremely clear and to the point, with the images organized in such a manner as to minimize confusion for the user.

FIG. 4 illustrates a new image being linked to the rest of the database, as an example. Lines joining the tags in different images are the visual representations of the hyperlinks formed through the connection of those tags. Various colors can be used to correspond to different tags that exist in the new image. Since the scope of the linking system is to link the middle image, lines are not drawn between the peripheral images. If they were to be drawn, there would be multiple lines crossing the screen, adding unnecessary confusion. In order to simplify, only the middle image is linkable. To link a different image, the user would simply swap the current middle image with whichever image he or she wanted to link, which would involve only a simple mouse movement.

In the case of a yet-uncreated tag, such as a new object that has not been present in any of the previously existing images, the interface would allow for the creation of a new tag. FIG. 5 illustrates an example of a "New Object" selectable field in the tagging menu. In this interface, the links are not drawn as lines connecting each image to other images, but instead when hovering with the mouse over a specific tag, all locations in the various images corresponding to that tag glow in a different color, e.g., green, while all of the other tags remain their usual color, e.g., yellow. Any image can be linked, not just the middle image, using this advantageous interface.

Image Ranking and Object Localization

Image Searching and Sorting Methods

A novel aspect of a web database system in accordance with the present invention is the method by which a search is conducted for a desired object in a set of images. This search is initiated when the user selects a certain location on a specific image. This location may or may not be one that has a direct link to other images. Provided below is a description of several methods of searching for a desired object, with each method. Each of these methods, alone or in combination, can be utilized for the purposes of the image ranking aspect of the present invention.

Geometric Interpolation

The first method for searching for the desired object is by taking the geometric relationship between neighboring links into account. For example, if all of the objects are assumed to be on a plane, then objects that are linked from one image to another will be expected to have a geometric relationship (i.e. they are all on a single plane, although the plane may be tilted or rotated or shifted due to the different viewpoints of each image).

As an example of this type of object matching, consider the following situation, as illustrated in FIG. 6. Three objects (a circle, ellipse, and square) are linked across two images. The user has selected a point on image 2 identified by the '?' symbol. Now, since in this example it is assumed that there is a geometric relationship between the linked objects, the selected point is interpolated to correspond to the location of the stick figure in image 1. Hence, image 1 is ranked highly and the specific location of the stick figure is selected as a likely result for the search.

It is important to note that the geometric interpolation approach could be performed based on other geometries (e.g., objects on a circle or globe—such as zoomed out satellite images taken of the planet, etc.). Also, because of the geometric constraints, it is possible to infer the relative size of the desired object. For example, in the example above, if the square, circle, and ellipse are far apart (as in the case of image 1) then it is likely that the desired image occupies a large portion of the image, whereas if those three linked objects are very close together, then the desired image would likely be very small. This information can be used in geometric interpolation search systems to provide a more accurate ranking of images.

Relative Locality Interpolation

The geometric interpolation described above can be generalized to the case of Relative Locality Interpolation, or "RLI". With RLI, the proximity of an object to another in one image results in a high likelihood that the same proximity will exist in other images. This is illustrated in FIG. 7. This is of course true in all situations where the image objects are geometrically related (e.g., all on a plane, box, etc.), or in situations where the images are taken of the same scene. However, this is also true in cases where the images are taken of similar objects.

For example, on the Internet, most images taken of the ocean also contain the sky. Hence, if a user is searching for something above what is an ocean (as defined by the hyperlinks), there is a high probability that it is the sky. Of course, the opposite does not necessarily hold, since if a user is searching for something below the sky, it may not be the ocean. This can easily be discovered based on the hyperlink structure, since in the first case, most of the images whose oceans are links would also have their skies linked as well, whereas most of the images whose skies are linked may not have another link to the ocean.

Euclidean Distance Interpolation

This method is computationally simple and still produces highly accurate predictions in most cases. When the user selects a point in one image, the distances between the selection and the points corresponding to existing links are calculated. An array of these links is created, with the closest link as the first element, and more distant links further down the array. Other images are ranked based on how many of the array links appear within them, giving higher weights to links closer to the first element of the array.

In the selected image, a triangle is formed with one side formed by joining the two links, and the other two sides by joining the links and the selected point. The estimate of the selection in the other images is calculated by taking each pair of points in the new image which also existed in the selected image, and scaling and rotating the triangle such that the same side appears between the two links in the correct order. The final approximation is just a weighted average of all of the triangulated estimate points.

Large-Scale-Link Interpolation

Another image search methodology is that of a Large-Scale-Link Interpolation, or "LSLI". With this approach, the database has a very large set of links for every image. This is possible in the case that this database is publicly available and the subsequent selections of all users who view the images result in the formation of location-to-location links between pairs of images. This methodology is illustrated in FIG. 8.

Of course, with this strategy it is possible that some of the links will be erroneous. However, as long as the number of links present is large, it is possible to find the desired object on other images by simply finding portions of an image with multiple links to the selected desired object. Furthermore, the neighboring location of the desired object could also be used to find other neighboring objects based on link clusters, and these neighboring locations could then be used as a method of validation for any object found in a specific image (somewhat similar to the RLI strategy). However, this would only be used as an optional validation, and the fundamental aspect of the LSLI methodology is to find image patches with a large number of links originating or relating to the desired object.

General Nature of Link-Based Image Sorting and Object Localization

Image sorting and object localization algorithms are well known in the art. The following is a generalized and mathematical version of the PageRank algorithm used by GOOGLE™ to sort web pages [19]. If a user selects the point $(x_0, y_0)$ on image i, then for each link k on image i (where k ranges from 1 to the number of links n), the distance based link weight $\Psi(i,k)$ can be computed. This weight will be inversely proportional to the distance between the selected point and the link point. One such possible equation for the calculation of $\Psi$ is shown below:

$$\psi(i,k) = e^{\frac{-\|(x_0,y_0)-(x(i,k),y(i,k))\|^2}{2\sigma^2}} \quad \text{(Eq. 3.1)}$$

where $\sigma$ is the relative width of the Gaussian, and $(x(i,k), y(i,k))$ is the aperture point on image i for link k.

Each of these link weights represents the degree of association of its respective link point to the point selected by the user. By virtue of the link itself, these weights also represent the degree of association between the points on the other end of the link on different images and the original user selected point. As a result, after traversing through all of the links in the initial image to all other images to which the links point— which might even be multiple images for each link (in the case of a cascading set of links for the same object)—for many images in the database there are a set of weights at some of the image's link aperture points. From these weights, both the validity of the image (based on its overall degree of association with the user selected object) and the most likely location of the user-selected object must be inferred.

Now, if the number of links on each page is small, then a geometric or rule based approach is required for obtaining accurate search results, as in the geometric interpolation or RLI approaches discussed herein. However, if there is a very large number of links available, which reduces the ambiguity of the search, then the weighted average of the link aperture points on each image for which a weight is available as the estimated location of the object. Also, the sum of the total weights for each image is used as the overall relevance of that specific image.

Object Localization and Searching with Fully Specified Multiple-Linked Tag ("MLT") Images For many applications, such as multiple images of a geographic location or scene, or in general images that occasionally have similar contents (such as photo albums), an object will appear in multiple images. In such cases, it becomes possible to search images based on their MLT tags. The obvious case is when a user is directly searching for a specific object, which has been correctly tagged in all images. After the user selects the object, the images can be sorted based on the best views of the object (as defined by an image ranking algorithm which will be described later) and the object can be highlighted in each image based on the MLT tags.

For user selections that are either directly on a link point or very close to one, the link point, as well as all of the primary associated links (the other links present on the same image), are selected as the object's location. Images that contain the selected object would be ranked higher than those that do not contain the link point, although a specific algorithm for image ranking is required. The nature of this algorithm becomes clearer when considering the case of an unlinked object being selected.

Object Localization and Searching with Partially Specified MLT Images

This more interesting situation arises with partially specified MLT images, for which either the tagging/linking is not perfect or the user wants to search for an object that has not been tagged or defined previously. Initially, it may seem that such a search is not possible. However, while a user might select an untagged/linked object in an image, the information related to the other tags and the location of the selected object can be used to perform an often accurate search for the undefined object.

Hence, this aspect of the present invention has two components: a system for image ranking based on the selection of a particular point on an image, and a system for object localization which estimates the location of a selected point on all images based on the initial selection. The prior information that is available is the link structures between the images as well as location of the selection.

The basic image ranking and localization algorithms consist of building a graphical representation of the link structure for the images and then utilizing graphical methods (similar to a Thevenin circuit analysis technique) in order to find the respective weights of all link points for a given initial selection. Those weights can then be used to find the rank of an image (the sum of the weights for that respective image) and the location of the image (the centroid of the weights for that respective image).

Image Ranking Algorithm with MLT Images

Before the algorithm is described, the notations are clarified below.

Let $f(im,ta,x,y)$ be the function that assumes that there has been a click on image im at location (x,y) with a click weight of w. It then returns, based on the number of tag/link points and the distances to these tags, the contribution of the click for tag/link ta. According to this aspect of the present invention, the $f(im,ta,x,y)$ used is the second order exponential function:

$$f(im, ta, x, y) = \exp\left(\frac{-\|(x, y) - (x_{ta}, y_{ta})\|^2}{2\sigma^2}\right) \quad \text{(Eq. 3.2)}$$

where $(x_{ta},y_{ta})$ is the location of tag/link ta, and where $\sigma$ is a constant that is set to approximately 0.2, as an example. $\sigma$ is a decay constant for the importance of tags in the proximity of the point clicked on in the image by the user. In practice, the user will be allowed to define whichever value of sigma they feel produces the best results.

In order to normalize the weights, it is desired to set $$w = \sum_{ta} f(im, ta, x, y) \quad \text{(Eq. 3.3)}$$

Therefore, $f(im, ta, x, y)$ will require this further normalization. Let w(ta) be the final weight assigned to tag ta after a click has been made.

The algorithm according to one aspect of the present invention can now be explained in terms of the following steps:

(a) The user clicks on image $im_1$. Compute w(ta) $f(im_1,ta,x_1,y_1)$ for all of the tags ta in image $im_1$.

(b) Let the vector TA be the tags on this clicked image, known as the primary tags. Also, set the weights of all other tags not in image $im_1$ to 0.

(c) Next, assume that the original image that was clicked on ($im_1$) no longer exists, and that only one of the elements of TA still exists in the remaining images. Let this tag be $TA_1$. Reset all partial weights P(ta) to 0. These partial weights are used to keep track of the contributions from all of the other tags, and are explained below.

(d) Next, cycle through all of the images except $im_1$ (which is now being ignored). In each image, if TA, exists, compile a list of all the neighbor tags $TA_1^{Friends}$ that are in the same images as all of the images in which tag $TA_1$ appears. For each tag F in $TA_1^{Friends}$, increase the partial weight P(F) by $f(im,F,x_F,y_F)$.

(e) After all of the tags F in $TA_1^{Friends}$ are processed as described above, normalize the redistributed weights, and add the overall weight of the tags as follows:

$$P_{TOT} = \sum_{F \in TA_1^{Friends}} P(F) \quad \text{(Eq. 3.4)}$$

$$w_{new}(F) = w_{old}(F) + \alpha \cdot w(TA_1) \cdot \frac{P(F)}{P_{TOT}} \quad \text{(Eq. 3.5)}$$

(f) Repeat starting from step (c), this time operating on the next element in TA, namely $TA_2$. Continue until all of the elements in TA have been processed.

In practice, the iteration of step (f) is typically only required a few times (3 often proves adequate, for example) since the parameter α is usually small (0.3, for example), thereby causing an exponential decay rendering further repetitions negligible. In the end, the weight vectors w(ta) provide the weight for each tag, which will result in a score for each image that is equal to the sum of the weights for that particular image.

Figure 9A:
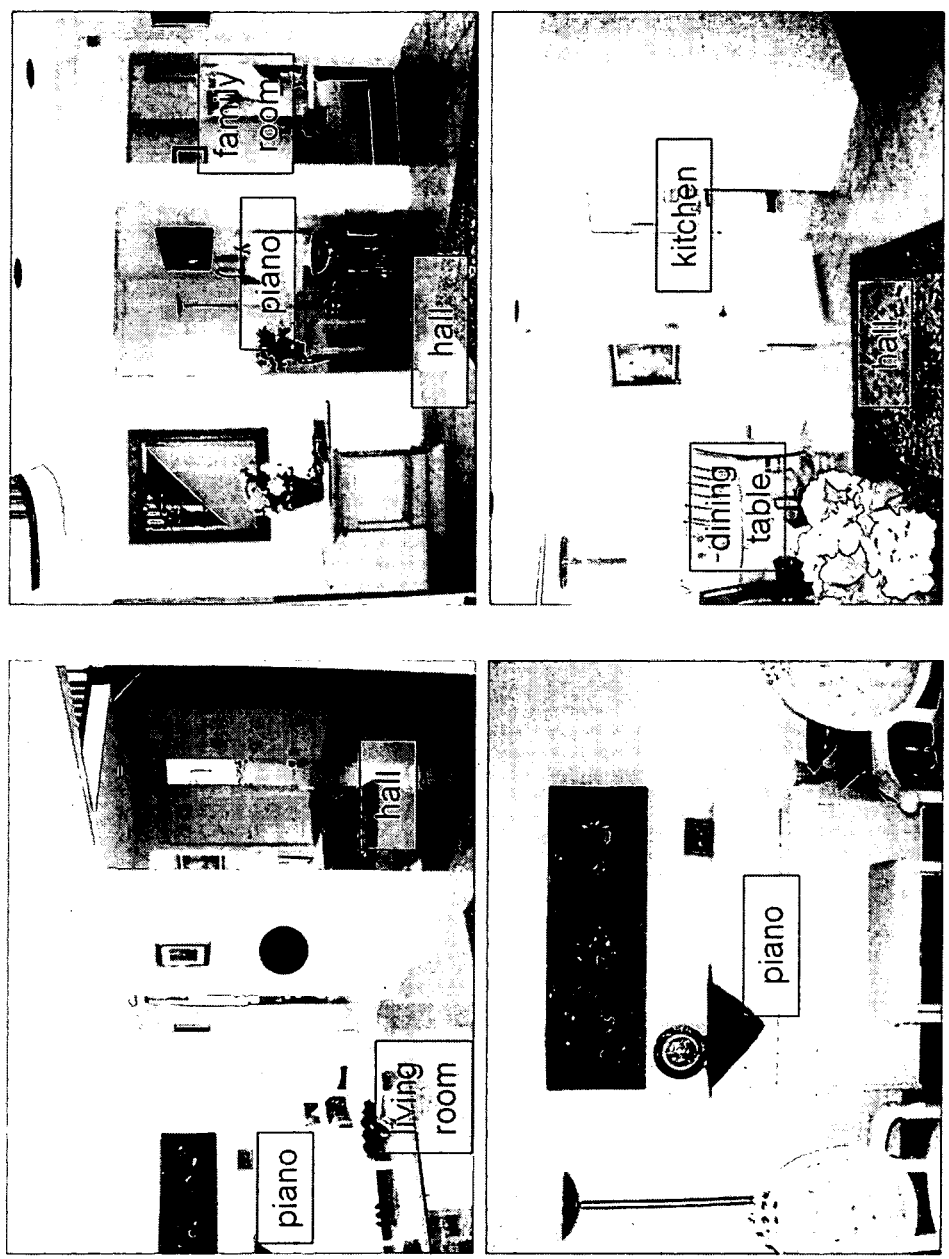
FIGS. 9A, 9B, 9C and 9D illustrate steps of an image ranking algorithm in accordance with an aspect of the present invention.
Figure 9B:
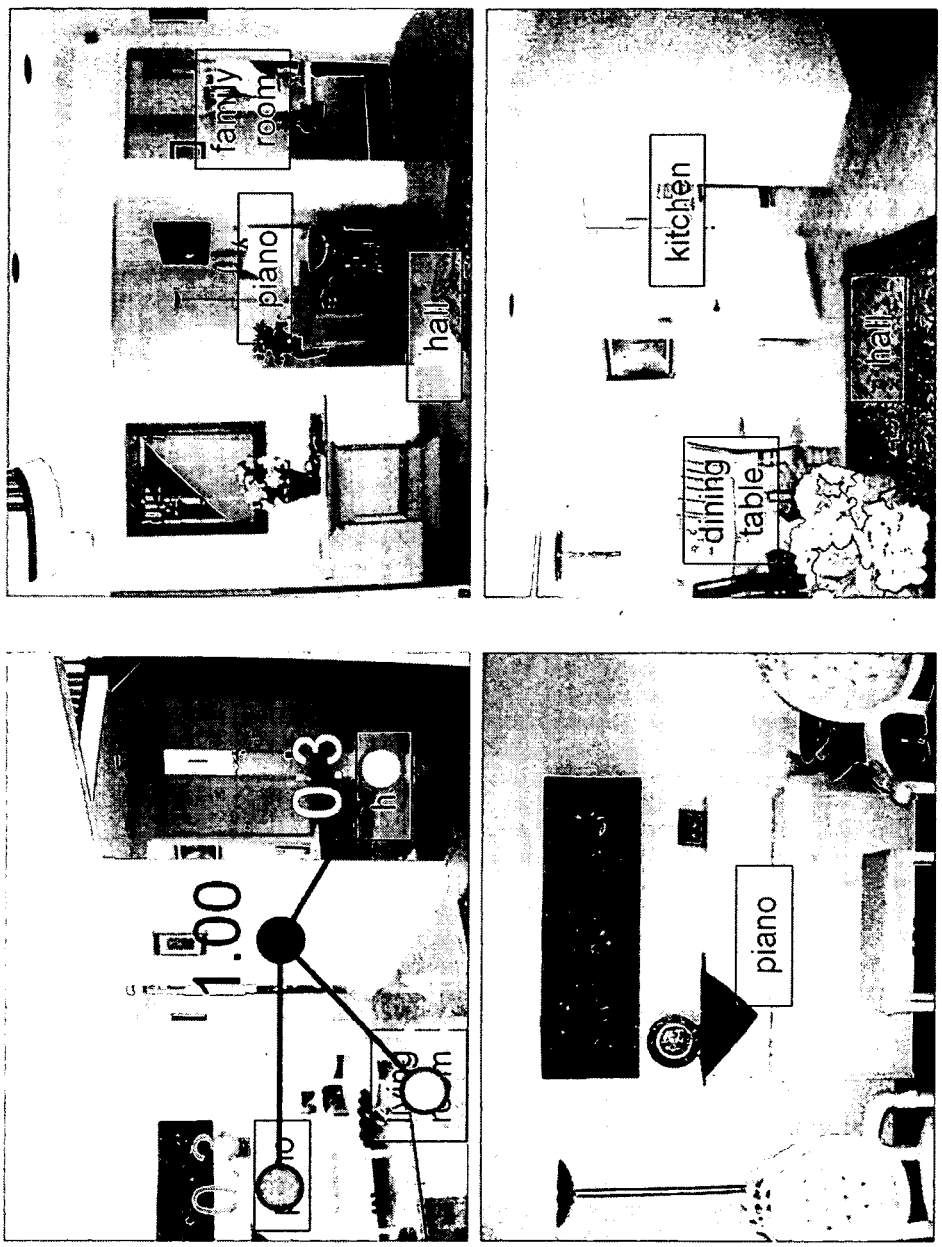
Figure 9C:
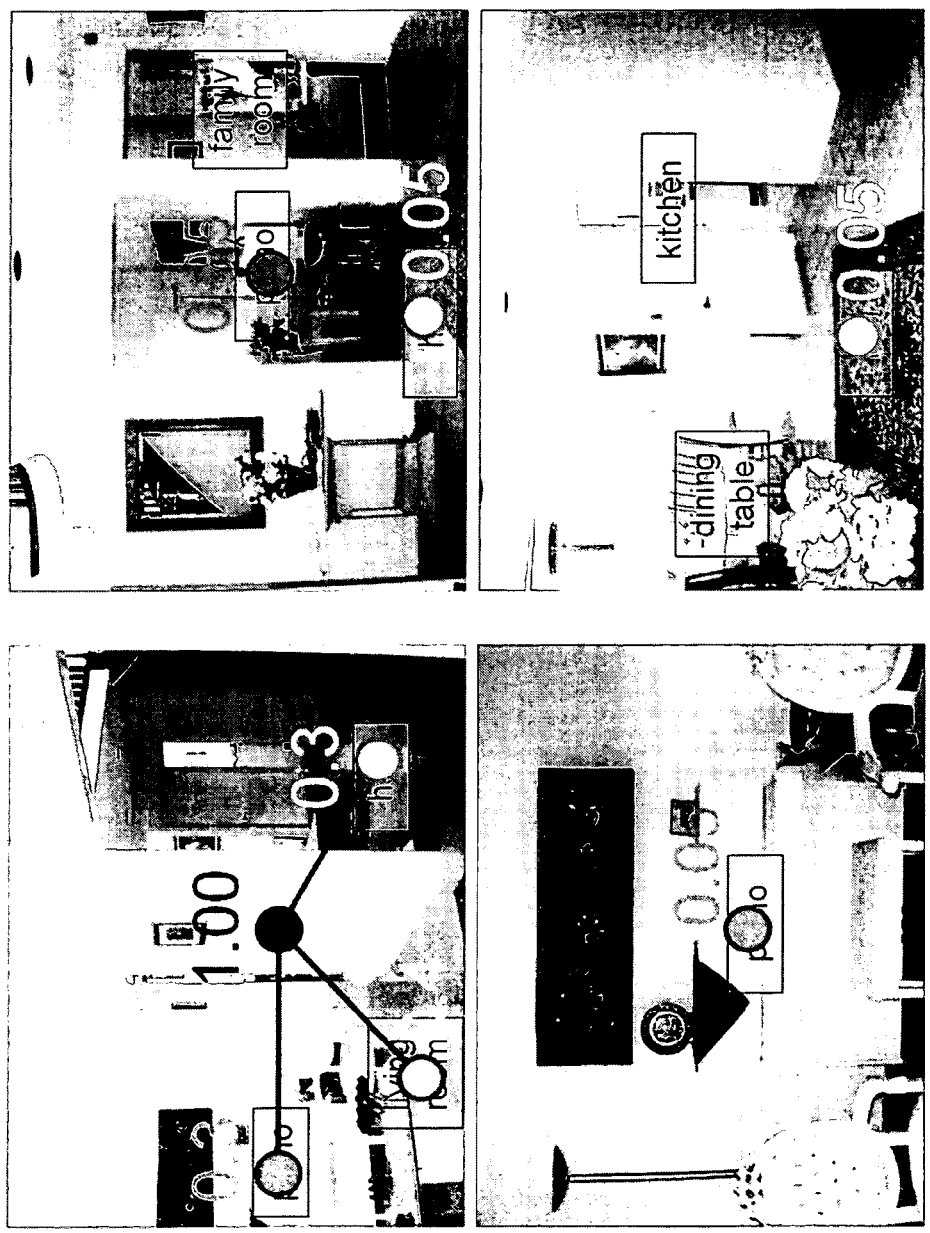
Figure 9D:
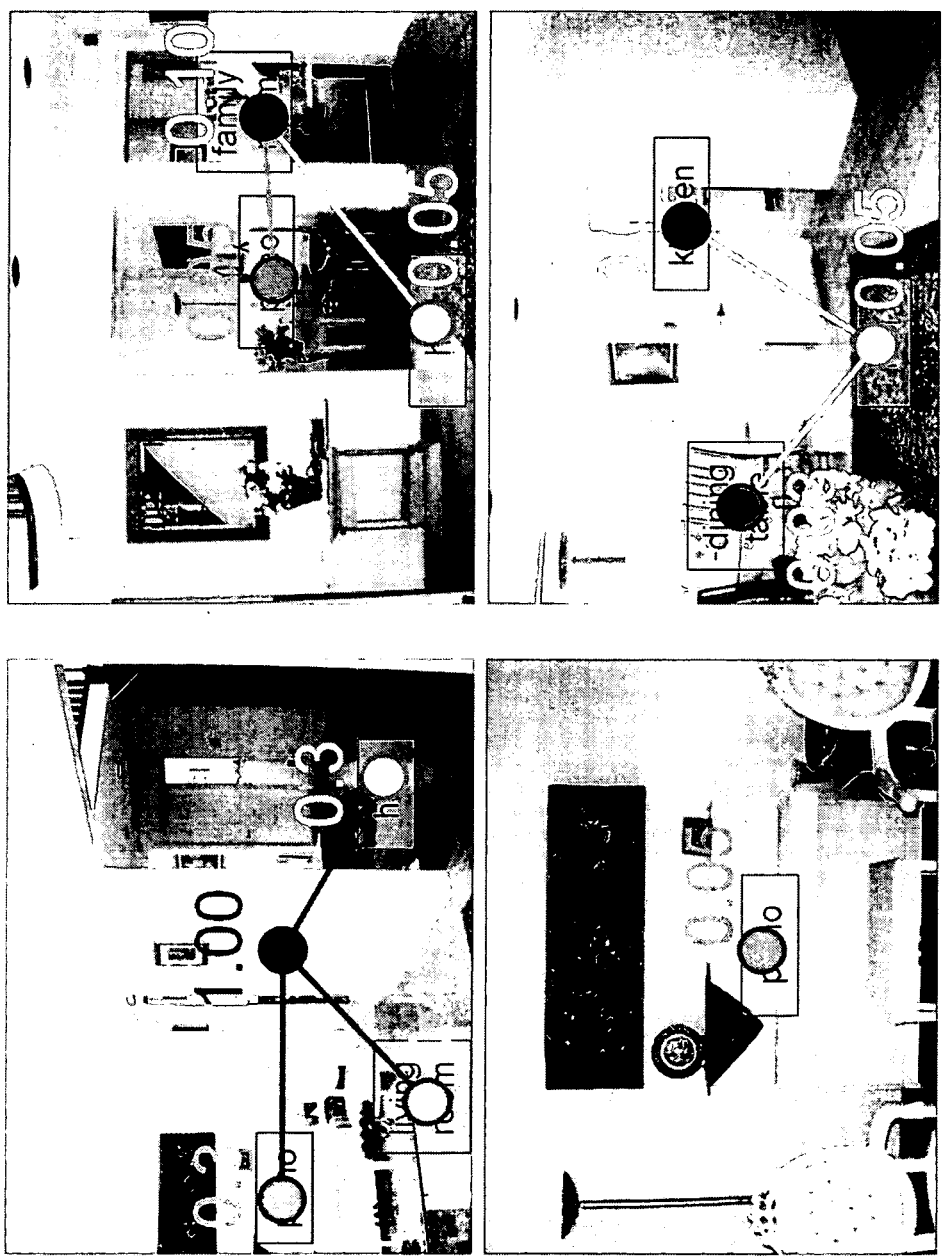

This algorithm is illustrated in FIGS. 9A, 9B, 9C and 9D. In particular, FIG. 9A depicts a user clicking on an image. In FIG. 9B, weights are spread to primary tags in the image. In FIG. 9C, each tag spreads its own weight across other images in which it appears. Finally, in FIG. 9D, the algorithmic steps are repeated on the next set of 'friend' tags. Note that the partial weights of the tag named 'family room' are added together to form its final weight.

Image Localization Algorithm with MLT Images

The best location estimate for an object within an image is the weighted centroid of the link points within an image where the individual tag weights correspond to the w(ta) weights calculated during the image-scoring phase.

An alternative localization technique is to use a non-weighted or weighted planar prediction technique. Assuming that the neighboring tags on the clicked image are in a plane with the click point, some of the tags can be found in other images and used to predict, based on planar geometry, where the location of the selected might be in the new image. In practice, the centroid-based location estimate has proved to be more precise, although a weighted planar prediction technique could provide a confidence measure in cases that it agreed with the centroid location estimate.

FIG. 10 illustrates an example of localization estimates.

MLT Search and Localization Examples

Figure 11:
FIG. 11 depicts an initial display of an interface for an image database.

As examples of aspects of the present invention, several working examples of image databases have been prepared. The first is a set of images taken both aerially and from the ground of the University of Toronto campus. This entire set (as it is initially displayed to the user in the interface) is illustrated in FIG. 11. The second set is of photographs taken inside and outside of a house, all in fairly close proximity. The third set is of photographs in a photo album, with several recurring subjects within the images.

Figure 12:
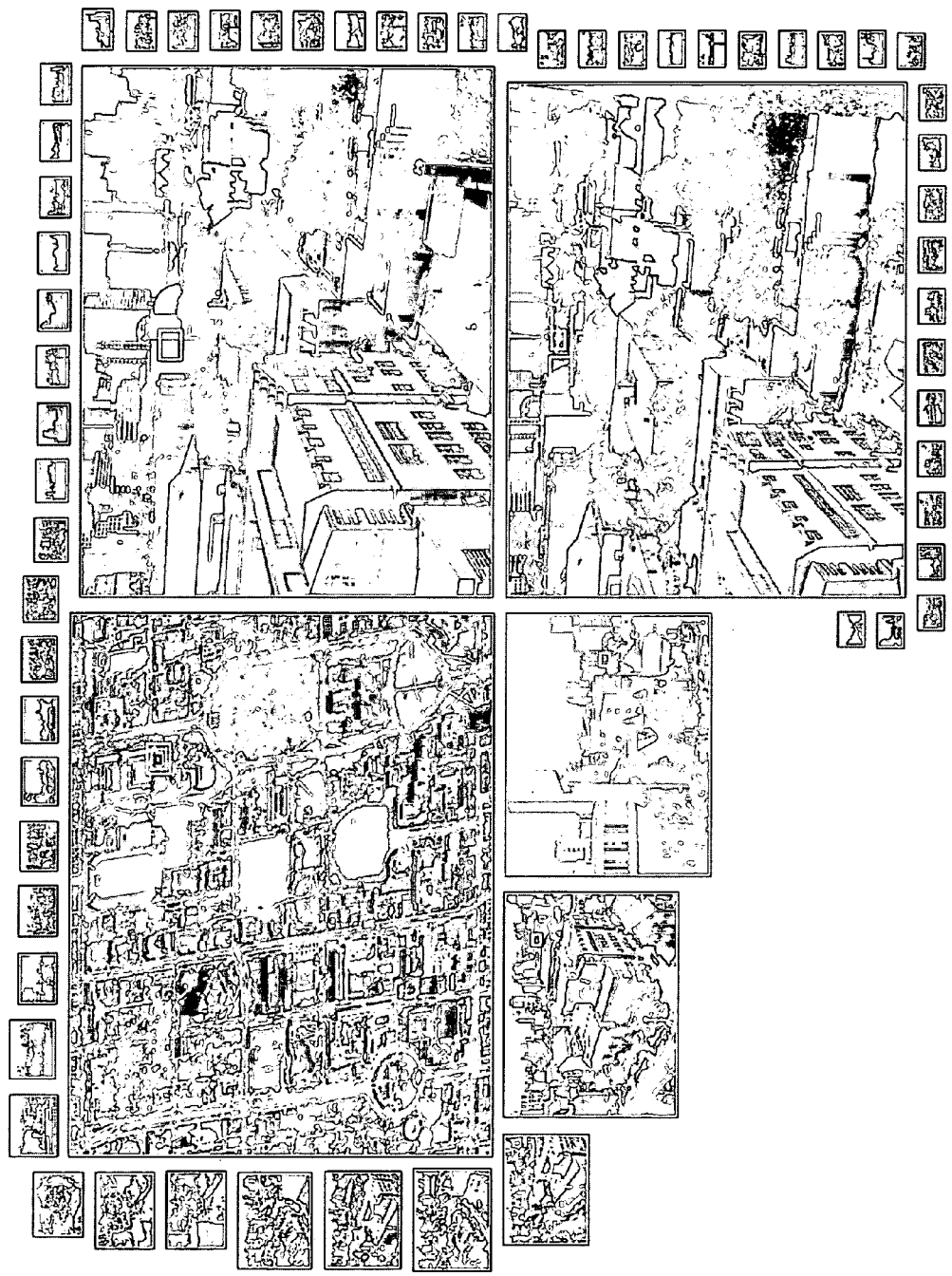
FIG. 12 illustrates localization and ranking of an untagged object in the image database.

FIG. 12 illustrates the selection of an observatory (seen in the pictures as a white hemisphere) that is not tagged or linked in any image. However, by selecting it in the satellite photo, the system correctly highly ranks the images that have the best view of this observatory. In all cases, the centroid-based localization (small box) is a good estimate of the object location, while the planar prediction estimate (large white box) provides the most accurate estimate of the object location.

Figure 13:
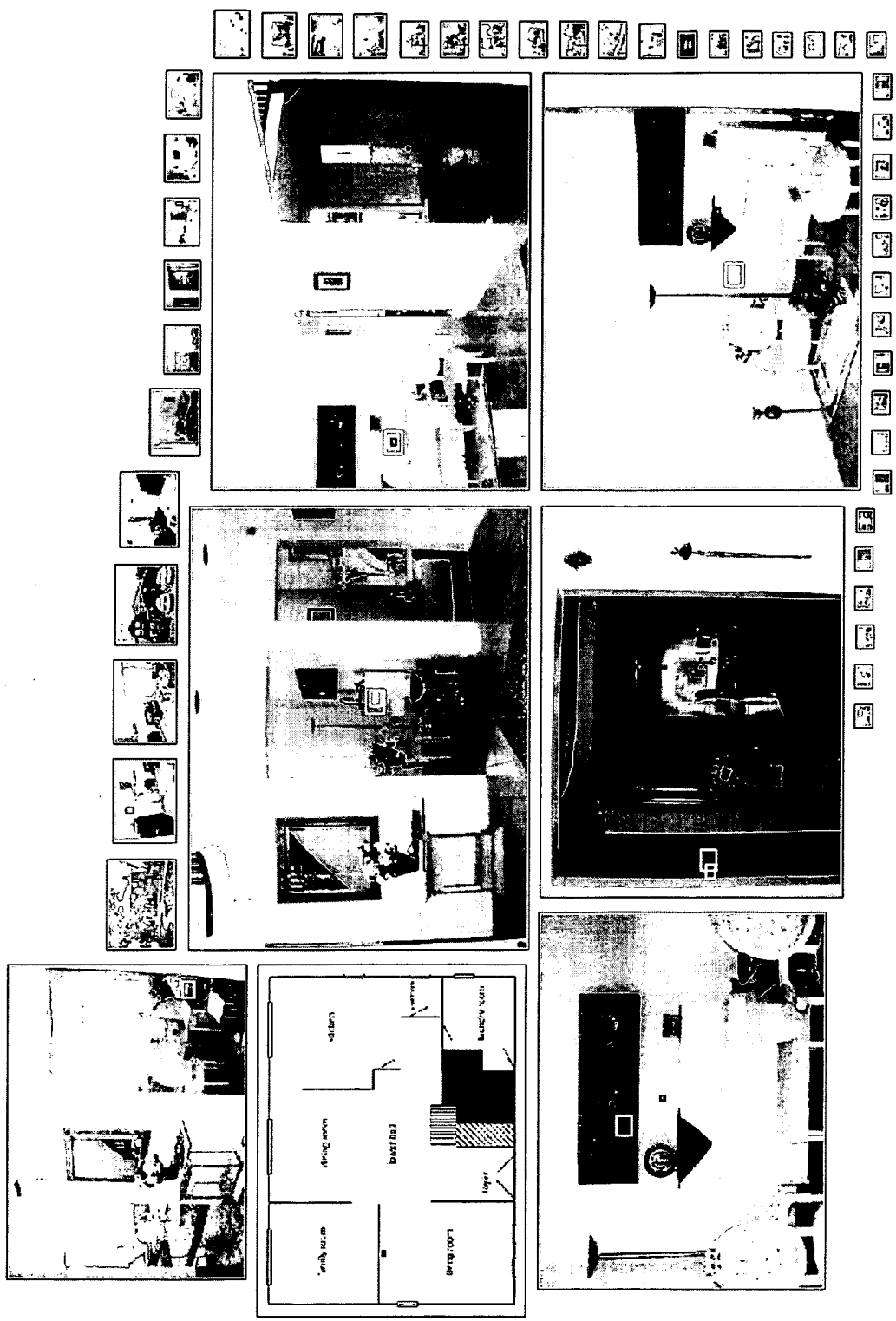
FIG. 13 depicts a localization and image ranking example for a piano in a 'home' database.

FIG. 13 illustrates a localization and ranking example, performed on the 'Home' image database. In this case, the user selects a point close to a linked object (the piano). Here, all relevant photos of the piano are ranked highly and the location of the piano in all images as well as the house floor plans has been correctly estimated by the centroid location approach (small box).

Figure 14:
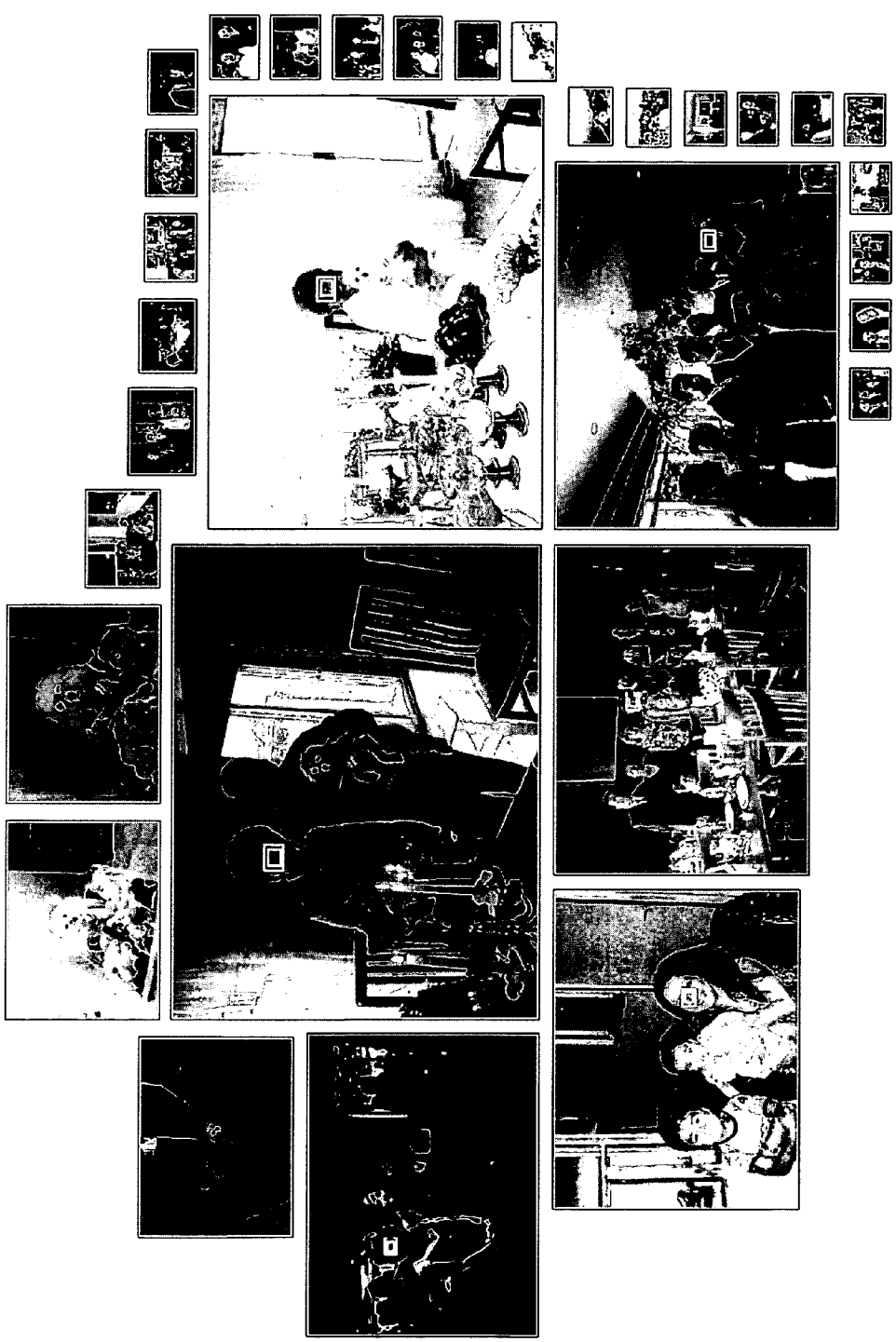
FIG. 14 depicts a localization and image ranking example for a woman holding a dog in a 'photo album' database.

FIG. 14 illustrates the searching and localization of the image of the woman in the large upper-right image (holding the dog). Since she has been correctly linked with the other images, her face has been found in all other images and those images have been ranked highly. However, since the selected image also contains the dog, the images of the dog have also been ranked somewhat highly, and in fact the only other image that contains both the woman and the dog has been ranked the highest (it is the largest image).

Image Display Interface

Display Optimization Requirements

A further aspect of the present invention relates to the presentation of the sorted images to the user. The images are sorted from greatest to least according to their relevance, determined by the ranking methods discussed above. To maximize the efficiency of the output display, three techniques are implemented.

The first technique is that the more relevant the image, the larger it should appear relative to the other images, allowing for easier viewing of the higher ranked images. The second technique is that the more relevant the image, the closer it should be to the most relevant image, resulting in a display in which the images radially decrease in relevance, with the most relevant image being the centre of focus. The third technique is for the displayed images to be packed into as small a size as possible thereby minimizing the user's required eye and pointer (mouse) movement between distant images in the case of the web-based application. These techniques help the user easily focus within the proximity of the largest image, thereby optimizing, among other things, the identification time for the desired image.

Display Packing Algorithm

Figure 15A:
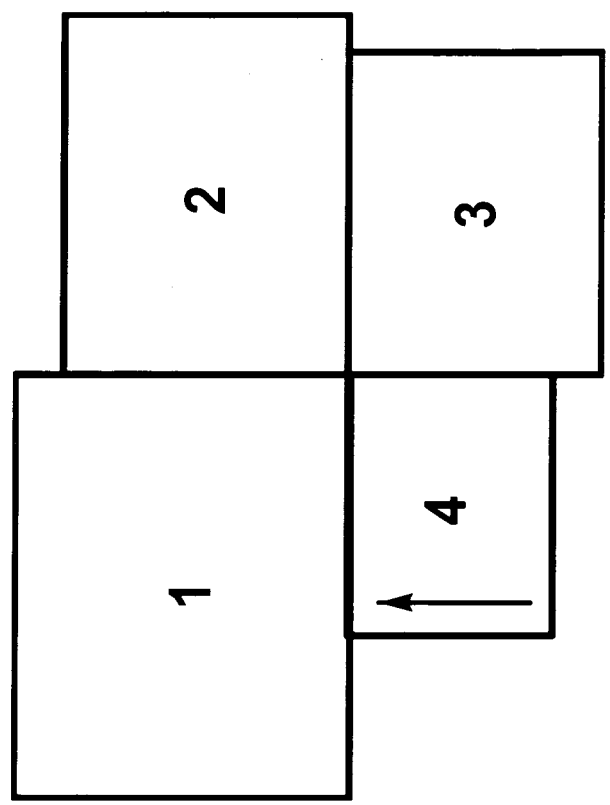

The following is an example of an image display packing algorithm in accordance with the present invention. It is assumed that all of the images in the database have the same aspect ratio, however the images that have different aspect ratios are appropriately padded within a frame to correct the aspect ratio. The images are ordered by size (frame width). The first and largest image is placed on a plane. The next three images are placed respectively such that they each have one corner adjacent to the bottom-left corner of the first image, as shown in FIG. 15A. The fourth image is denoted as pointing "up". This direction parameter is needed in the packing of the remaining images.

The remaining images are positioned around the four main images in a recursive fashion. Since the fourth image's direction is "up", the fifth image attempts to be placed above the fourth image. In general, a new image attempts to be placed in the direction pointed to by the previously placed image. Successful placement implies that the newly placed image does not overlap any of the already-positioned images.

Figure 15B:
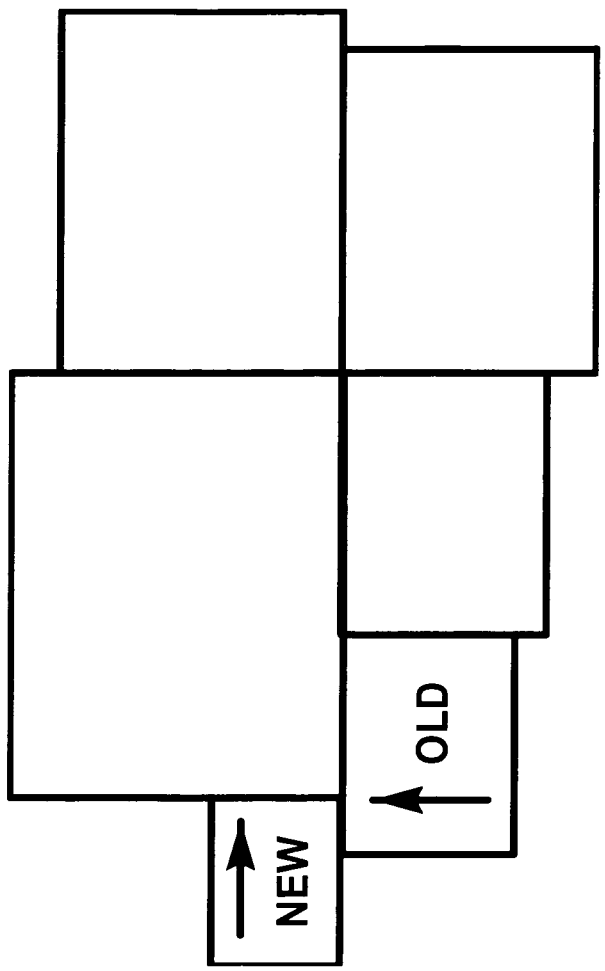

If the new image is successfully placed, it assumes the direction one quarter-turn clockwise from the previously placed image's direction. In the case of the fifth image, if it is successfully positioned above the fourth image, it assumes the direction "right". FIG. 15B shows the result of the sixth image being placed atop the fifth.

If the new image is unable to be placed in the specified direction, the direction is rotated one quarter-turn counter-clockwise. The new image always attempts to be placed in the most recently specified direction. Therefore, if the fifth image cannot be placed above the fourth image, the new direction becomes "left", and the fifth image attempts to be placed to the left of the fourth image. This is the case demonstrated in FIG. 15C, after which the sixth image too cannot be placed atop the fifth, unlike in FIG. 15B.

If an image fails to be placed within four attempts (one attempt in each direction) then the packing is terminated, as there is no more room for any new images. Otherwise, this packing is continued until all of the images are placed, or until the sizes of the images become smaller than a user-set threshold size, in which case they become too small to be understood when displayed on the screen.

The placement of a new image is accomplished using the following method. The same method is used for placements in all directions; however only the "left" placement will be more thoroughly explained, as the other placements are rotationally symmetric to it. In the "left" placement, the new image is positioned such that its top-right corner coincides with the bottom-left corner of the previous image. If the new image overlaps an existing one, the attempt fails, and the direction becomes "down" or in the case that this was the fourth attempt, the packing is terminated.

Figure 15D:
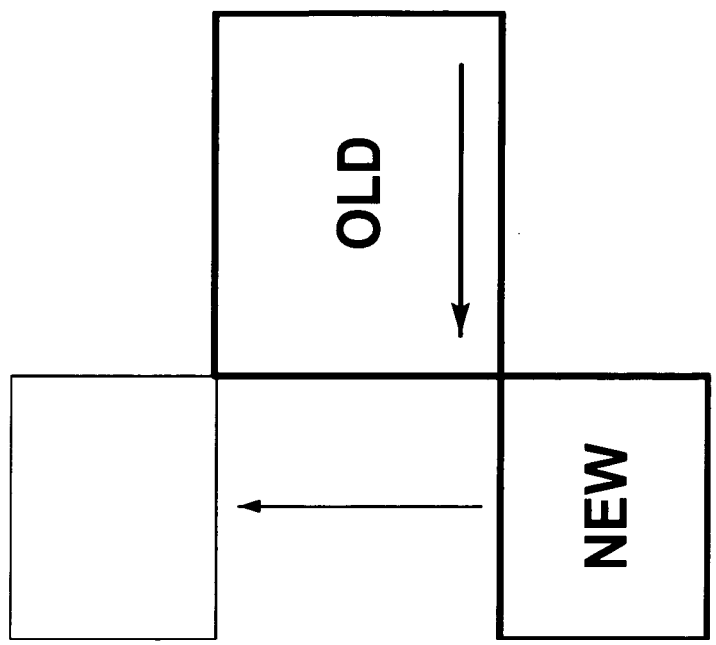

However, if the new image does not overlap any of the existing ones, the attempt succeeds. The new image is then pushed as far up as it can slide before overlapping any existing image and before its bottom-right corner touches the top-left corner of the previous image. FIG. 15D illustrates the placement of a new image to the left of an old image.

The same process is then repeated on the next image, whatever its direction turns out to be. After the packing is completed, the aggregate of images is expanded so that it best fits the viewing area such as a user's window.

In order to further optimize browsing, a special interface is used. When the pointer is moved over an image, that image is enlarged for clearer viewing causing a magnifying glass effect. If this initial zoom amount is not enough, the user is then able to further enlarge the image using an alternate click, such as a right mouse click or mouse scroll. Finally, after the user selects a point in a particular image and the new layout is calculated, a linear translation of the images from their initial positions to their new positions occurs. This transition makes it easy for the user to follow where the selected image moved as well as to simultaneously track the new locations of other images.

This animated sequence, that transitions from the previous sorted and resized images to the ones after a new selection is made, is important for the developed system. Since, based on the image packing algorithm discussed above, the exact location of the images based on the weight/ranking vector is known, instead of quickly jumping from the images displayed for the previous weight/ranking vector to the new sorted and resized images for the weight/ranking vector corresponding to the new user click, an animation sequence where the images gradually shift from one arrangement to the next is employed. This animation, apart from being visually pleasant, is important in the functionality of the application since it allows the user to keep track of his or her images of interest (such as a satellite image) even after repeated selections and rearrangements.

ViewGenie Interface

The term "ViewGenie" refers to a particular embodiment of the present invention that is a system application allowing users to search, sort, and display images. ViewGenie can be accessed through the World Wide Web, and is a practical, easy-to-use system, useful for a variety of applications as particularized below.

Registration and Login

Preferably, ViewGenie requires user registration before it can be used. In order to register, the user must click on "Register an account" located below the "Login" button. The user will then be directed to a separate page, required to enter an email address and password in the required fields, along with his/her first and last name, as an example. This can be entered by clicking on each empty field, and typing in the required information. Once all the required fields have been filled out, the user can click on the "register" button at the bottom of the page to complete registration. In order to log in each time, the user has to go back to the main ViewGenie page, and enter the registered email address and password, followed by a click on the "Login" button.

Uploading Images

Once logged in, the user may view and upload images, organizing them into chosen folders. An image can be uploaded to ViewGenie using the following instructions:

1. Click on "Upload Image", located in the upper bar of the interface.
2. Click on the field beside "Upload To:", selecting "New Folder".
3. Enter the folder name, and adjust the preferred permissions by selecting either "Everyone", "Friends", or "Only Me" for both viewing and tagging permissions.
4. Click on the "Browse . . . " button, and choose an image to add to the new folder by browsing the computer, and double clicking on the chosen image.
5. If you choose to add more than one image to the selected folder, repeat step 4 until all images have been added. Otherwise, proceed to step 5. Up to ten images may be uploaded at once.
6. Click on "Submit Images".
7. To upload images to a previously created folder, repeat step 1, click on the field beside "Upload To:", followed by a click on the selected folder, and repeat steps 4-6.

According to this particular embodiment, there are at least three modes available to the user: View, Organizer, and Tag.

Tag Mode

Figure 16:
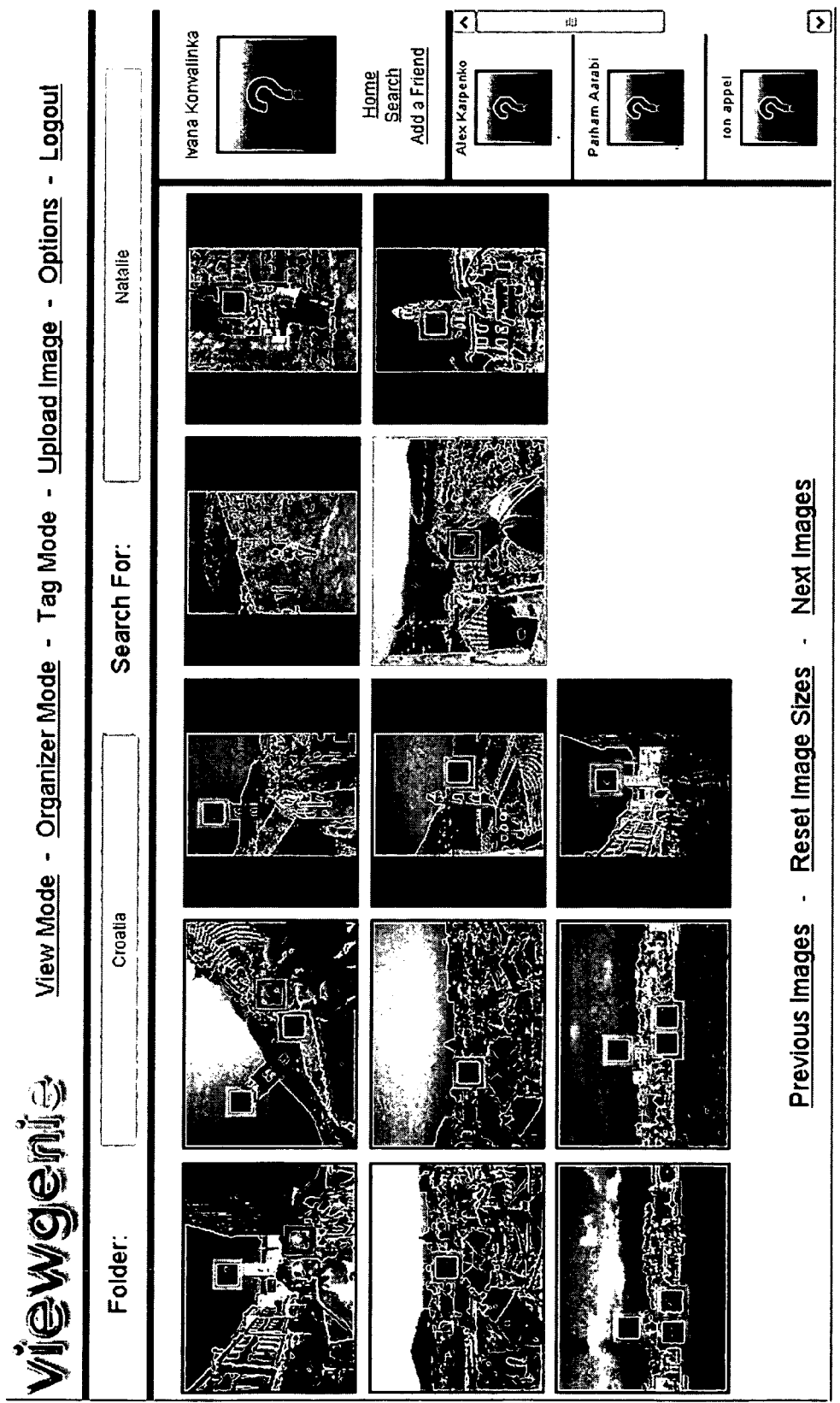
FIG. 16 illustrates a tag mode example shown on a web-based interface.

Tag Mode allows tags to be assigned to particular objects within an image, identifying people or places within pictures. Once images have been uploaded, the user can allocate tags using the following steps:

1. Click on "Tag Mode" in the upper bar of the interface.
2. Click on the field next to "Folder:", and scroll down to select the folder that contains images to be tagged. By clicking on the folder, all the images contained within will be displayed on the screen.
3. Click on an object within an image you wish to tag.
4. Type in the name of the tag in the field that appears, and press Enter once finished. A small box will be placed around the object, signifying a tag, as shown in FIG. 16.
5. If a tagged object appears in other images and you wish to tag it, click on the object in each image, and scroll down the list of tags, selecting the corresponding one by clicking on it.

Therefore, for objects that reappear in multiple images, a uniform tag can be assigned. For example, if a common person appears in several uploaded pictures, ViewGenie only requires for the tag name to be entered once, allowing the user to tag that person in each picture. When the user moves the cursor over a tag, the color of the box changes, maintaining this color change throughout all images in the display containing the specified tag. For example, in FIG. 16 the cursor is placed over the tag "Natalie", color coding the tag in a specific color, e.g., green, for every image it appears in.

View Mode

Figure 17:
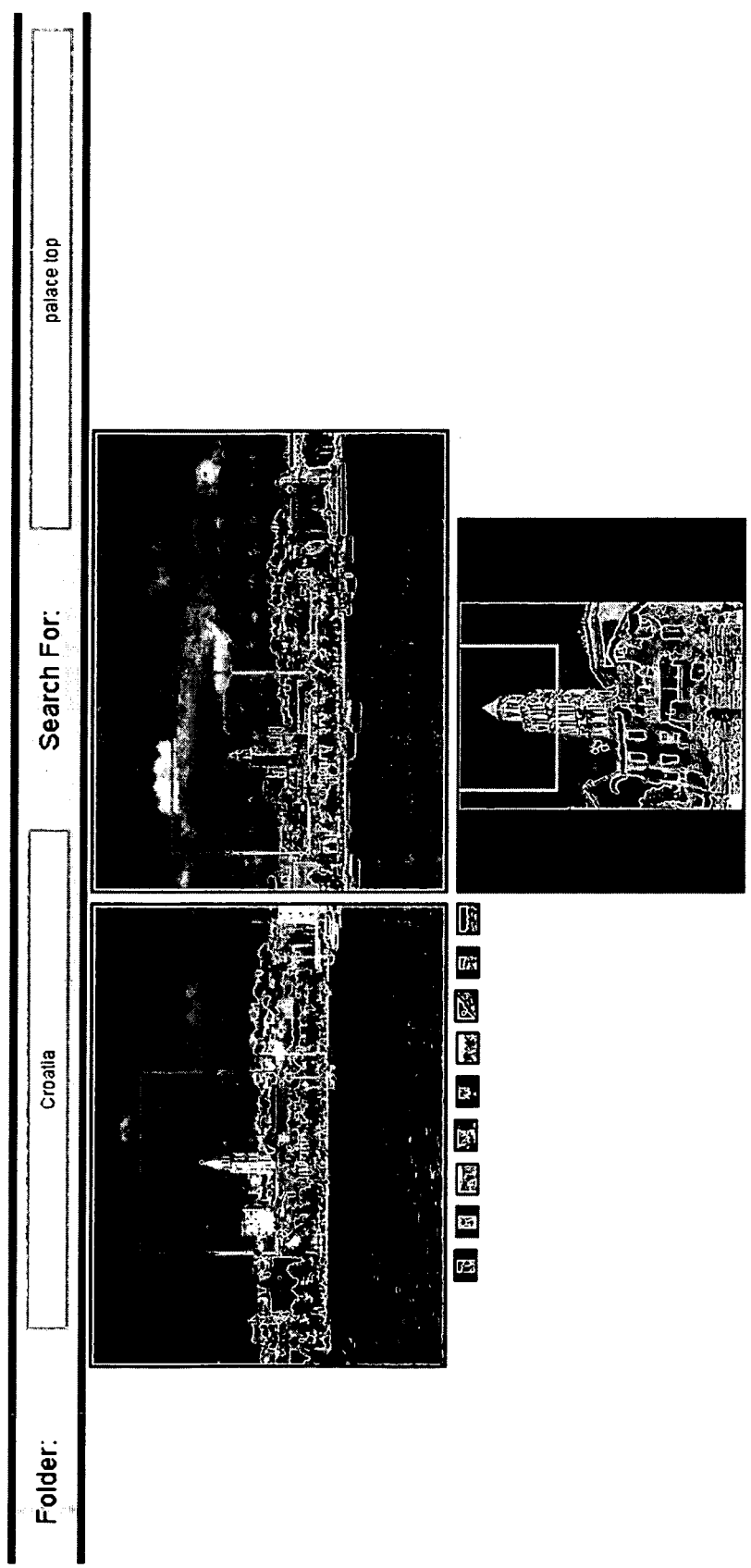
FIG. 17 illustrates a view mode example shown on a web-based interface.

The user can switch to View Mode by clicking on the option in the top bar of the screen. ViewGenie uses this mode to search for selected objects, find common tags, and prioritize images according to relevance. The user can view uploaded images by clicking on any folder in the field next to "Folder:", followed by clicking on the desired folder or "All Folders" to view all of the images contained. If the user clicks on any object within an image, ViewGenie searches for other images containing that object or any other tagged objects in the selected image, prioritizing them appropriately. The images are then automatically displayed as shown in FIG. 17, where a box is placed around the approximate location of the selected object in each image, and its tagged name appears in the search field. In order to get back to the general "View" display, the user can click on the folder field again, and select the desired folder.

If the selected object has not been tagged, ViewGenie will still approximate its location in all relevant images, using the information of the coordinates of other tags in the selected image.

Organizer Mode

Organizer Mode allows the user to delete and organize images and folders. The user can switch to it by clicking on "Organizer Mode" in the upper bar of the display. Images can be viewed by selecting a folder, the same way as is done in View Mode. If the user clicks on an image in this mode, a field with two options appears, "Move To . . . " and "Delete View". If the user clicks on "Delete View", he/she is prompted to "Remove the image and all its tags", and can click on the "OK" button to remove the image from the system. If the user decides to keep the image, he/she can do so by clicking on the "Cancel" button. Clicking on "Move To . . . " displays a list of created folders, and the user can move an image by clicking on the selected folder in the list. Therefore, by clicking on each image, the user is given the option to move the image to any folder, or delete it.

While images are displayed in the aforementioned modes, the user can enlarge each one by right clicking on it. The image continues to enlarge with each right click, until it reaches its full size. Moving the cursor away from the image returns it to its original size in the display.

ViewGenie Friends

Another feature of ViewGenie includes the ability to search for friends registered for the system, allowing the user to view pictures and tags uploaded by friends. The user can search for friends by clicking on "Search" on the right side of the screen. The user should then click on the blank field below "Search for friends", and type in the name of the friend, followed by a click on the "Search" button below the field. If the specified friend is not registered, the user will be notified with a "There is no match" message. However, if the friend is found, the name and picture of the friend will appear below the user's profile, as well as an "Add as Friend" option, which the user can click on. Once successfully added, the friend will be notified next time they log in. Friends can also be added by clicking on "Add a Friend" on the right side of the display, and entering the friend's email address in the field that appears, followed by a click on the "Add" button. If the friend is not found, the user will be notified with a "The user does not exist" message.

ViewGenie displays all of the user's friends on the right side of the screen, below the user's profile. Names are highlighted in blue if the friendship is mutual, and thus the person has confirmed the user as a friend. If the friendship has not been confirmed, the name will appear in red. The user can click on the person's name at any time to view their uploaded profile, pictures and tags.

Applications

The algorithm according to one aspect of the present invention can be used for a variety of applications where overlap or relations exist between the objects in the images. In fact, the approach is not limited to images but can also include videos, audio, external links, as well as any other document where a set of links from one entity to another might exist.

Environment Exploration

One example application is in the exploration of a certain environment where multiple images have been taken. For example, the search algorithm can be used for exploring the inside of a house including two floor plans (one for the upper floor, one for the lower floor). The user can click anywhere on any image, including on the floor plan images, and the system automatically searches for the specified object in all other images and brings up the most relevant images.

Such a system would be very useful for many applications, including uses for real estate agents and home sellers/buyers who want a more effective and interactive method of displaying the inside and surroundings of a house. In such an application, all that a real estate agent or a house seller would need to do is to take several images, upload them to the ViewGenie image site, tag the images (a quick process taking about 10 seconds per image), and finally either link to the ViewGenie site or post the ViewGenie viewer to their own site. This way, customers can view the house directly on the agent/seller's website.

Other applications of this technology include intelligent ViewGenie images for shopping centers, malls, schools, hotels, etc.

Combining Satellite and Local Images

A combination of local and satellite photos can be uploaded to the ViewGenie site. By selecting any point in any image (satellite image or not) the system zooms into the selected object from the available images, which are sized and ranked according to their relevance. Applications of this method could include smart ViewGenie images applied to amusement parks, recreational parks, hotels, beaches, cities (for tourism), archaeological sites, and so much more.

It should be noted that the ViewGenie system could readily work with live images. In other words, once the tagging occurs based on fixed spatial landmarks, the images can be updated from the individual cameras. As a result, a hotel may place numerous cameras around their facility and allow for the interactive ViewGenie system to work with dynamic/changing images that are captured in real time.

Remote Site Exploration

Another class of applications of the present invention includes remote sites such as archaeological sites that may be hard to visit in person, or environments (deep under water or other planets) that may be completely inaccessible to humans. As a result, once numerous images from these sources are taken and uploaded on ViewGenie, a user can interactively explore the environment by clicking sequentially on selected points of interest.

Personal Photo Exploration

Personal or group photo albums can also benefit from the relational object tagging approach of ViewGenie. By tagging a few of the objects in each image, it becomes possible for a user to search for other objects based on their relations to the known tagged objects. This would allow the already available spatial tags in FLICKR™ (called Notes), or in BUBBLESHARE™ (called captions), or in FACEBOOK™ (called tags), to be applied in a way that is currently impossible without the use of the ViewGenie system.

The ViewGenie photo album explorer could be used to share pictures with friends, organize pictures from important events or dates into albums, and allow friends to access all pictures they appear in. This could also be extended to mobile applications, allowing users to share mobile pictures with friends.

Medical Applications

ViewGenie could also be used for medical purposes, such as tagging and sorting medical images, including those obtained using MRI, ultrasound, and X-rays. Tagging particular areas found in images can be very useful in organizing images taken at different angles, and would aid in better presentation of images for each patient, each particular disease, fracture, etc. For example, if someone is looking to do a presentation on big tumors, ViewGenie can pull up and sort corresponding medical images at once. It could also be used for localization of certain areas that may not be obvious at all imaging angles, allowing radiologists to have a better perspective when diagnosing diseases, characterizing fractures, etc. The algorithm could also be extrapolated to 3-D image tagging, making localization more accurate. An example of this application is diagnosing and localizing an aneurism in the brain, which may be hard to characterize at certain perspectives. An important extension of this is aiding in image-guided procedures, such as performing surgery to clip the aneurism in order to prevent it from bursting. Image-guided procedures involve the generation of images at the time of surgery in order to guide its delivery. ViewGenie could be used to advance these procedures, by tagging important areas in real-time during the surgery, such that each time a new image is taken, these areas and the apparatus used could be localized. As frames are continuously taken, significant areas within the image would be tracked, and the surgeon would be better navigated through the procedure.

Smart Image Posting

An important ability related to ViewGenie, once the images have been uploaded and tagged, is to post or place the ViewGenie viewer as a smart image in external sites. According to this aspect, a regular-looking image is actually a 'smart' ViewGenie image, on which clicking will allow for the object-specific search to take place. In other words, the user sees a regular object in an external (external to the ViewGenie server) website or blog, but by clicking on the object, the user gets the full benefit of a searchable ViewGenie image set.

Extension to Videos and Multimedia

The present invention can also be applied to videos and multimedia. For videos, every frame of the video can have ViewGenie links (to other frames in other videos or to other standalone images). This allows the specific video to be searchable both in time and in the spatial dimensions. A similar approach could be implemented for audio, where searching only in the temporal dimension would be useful. Finally, it is useful in the case of videos to compress the video into a montage of significant/important frames. This would simplify the linking and searching process considerably without sacrificing performance (as long as the montages are properly obtained).

This application could be used to search videos for specific locations, people, objects, or scenes. This could be applied to security videos, used to monitor tapes of rooms, buildings, and intruders, as well as track movement in videos in real-time. It could also be incorporated into personal videos and movies, locating scenes with a particular person without having to view the entire video. This could be an additional feature for a friend database, adding videos of friends along with images, and tagging them accordingly.

Integration with External Links

It should be expressly understood that elements on the ViewGenie system do not only have to be images, videos, or audio/music segments, but in fact could be any other document or external link. In the case of documents and external links, a notion of spatiality may or may not exist, but in either case the ViewGenie approach can be readily applied as in the case of images and videos.

A very useful set of external links is images that are stored and/or tagged externally on other sites such as MYSPACE™, FLICKR™, BUBBLESHARE™, FACEBOOK™, etc. By incorporating external links directly into the ViewGenie system, it becomes possible to tap into a vast network of images for the most comprehensive single-click interactive search possible.

It will be appreciated by those skilled in the art that other variations of the preferred embodiments may also be practised without departing from the scope of the invention.

LIST OF REFERENCES

[1] Content-based image retrieval at the end of the early years, Smeulders, A. W. M.; Worring, M.; Santini, S.; Gupta, A.; Jain, R., *IEEE Transactions on Pattern Analysis and Machine Intelligence*, December 2000, Volume: 22, Issue: 12, pp. 1349-1380.
[2] U.S. Pat. No. 5,579,471.
[3] U.S. Pat. No. 6,084,595.
[4] U.S. Pat. No. 6,317,740.
[5] U.S. Pat. No. 6,324,299.
[6] U.S. Pat. No. 6,556,710.
[7] U.S. Pat. No. 6,611,628.
[8] U.S. Pat. No. 6,647,157.
[9] Virage image search engine: an open framework for image management, Bach, Jeffrey R.; Fuller, Charles; Gupta, Amarnath; Hampapur, Arun; Horowitz, Bradley; Humphrey, Rich; Jain, Ramesh; Shu, Chiao-Fe, Proc. SPIE Vol. 2670, p. 76-87, Storage and *Retrieval for Still Image and Video Databases IV*, Ishwar K. Sethi; Ramesh C. Jain; Eds. 03/1996.
[10] Nicu Sebe, Michael S. Lew, Dionysius P. Huijsmans: Multi-scale sub-image search, *ACM Multimedia* (2) 1999: 79-82.
[11] U.S. Pat. No. 6,813,395.
[12] Yasushi Kiyoki, Takashi Kitagawa, Takanari Hayama: A Metadatabase System for Semantic Image Search by a Mathematical Model of Meaning. *SIGMOD Record* 23(4): 34-41 (1994).
[13] U.S. Pat. No. 6,999,636.
[14] U.S. Pat. No. 7,003,140.
[15] U.S. Pat. No. 7,027,644.
[16] U.S. Pat. No. 7,035,483.
[17] U.S. Pat. No. 7,039,255.
[18] U.S. Pat. No. 7,054,481.
[19] Sergey Brin and Lawrence Page (1998). "The anatomy of a large-scale hypertextual Web search engine". *Proceedings of the seventh international conference on World Wide Web* 7, 107-117.

What is claimed is:

1. A computer-implemented method for searching, sorting and displaying images, the method comprising:
   (a) identifying one or more objects within a first image of a plurality of images, each of the one or more objects being associated with a first location in the first image, and undertaking the following steps for each of the one or more objects:
      (i) identifying the object within at least one of the remaining images of the plurality of images to define second images, the object being associated with one or more second locations in the second images; and
      (ii) creating links by means of one or more computer processors, between the first location and the one or more second locations, said links defining a link structure between the first image and the second images;

(b) obtaining a user selection of a location of a selected image that identifies a search object, said search object being a linked object or an unlinked object in the first image;

(c) sorting the plurality of images by utilizing the search object as input for a sorting mode operable to: (i) identify the distance between the search object and at least one secondary object in the first image as a first image proximity; (ii) use the links between first and second locations to locate associated objects in the remaining images of the plurality of images; (iii) interpolate the location of the search object in the remaining images by using the distance between the search object and at least one secondary object in the first image, and the locations of the associated objects in the remaining images of the plurality of images; and (iv) sort the plurality of images by a review of relative distances between image objects in the plurality of images based on the first image proximity; and (d) displaying the one or more sorted images.

2. The method of claim 1 further comprising the step of the sort mode applying an interpolation means.

3. The method of claim 2 further comprising the step of selecting the interpolation means selected from the group consisting of geometric interpolation, relative locality interpolation, Euclidean distance interpolation, or large-scale-link interpolation.

4. The method of claim 1 further comprising the step of determining the relative distance by localization and ranking achieved using a graphical representation means, said graphical representation means comprising:

(a) calculating weights based on the second locations, each weight corresponding to each of the second images; and (b) determining an image ranking of the second images based on a sum of the weights.

5. The method of claim 4 further comprising the step of determining an object location within a particular image by utilizing a weighted centroid of one of the one or more second locations.

6. The method of claim 1 further comprising one or more of the following steps:

(a) creating one or more tags and applying said one or more tags so that the same one of the one or more tags is applied to the one or more first locations and the one or more second locations that correspond to each other in accordance with the link structure;

(b) creating the one or more tags to each contain information associated with the one of the one or more objects, and the tags being operable to provide an additional means of sorting the plurality of images; and (c) operating the link structure to sort the plurality of images on the basis of a distance between a selected location of a selected image of the plurality of images and the location of the object in the selected image, and said links being based on the link structure that is operable to sort the plurality of images on the basis of a relative distance between the selected location and the locations of the image object.

7. The method of claim 4 further comprising the step of displaying one or more images from the plurality of images, whereby the ranking determines image size.

8. The method of claim 4 further comprising the step of displaying one or more images from the plurality of images, whereby the ranking determines image position.

9. A computer-implemented method for searching, sorting and displaying one or more images, the method comprising:

(a) creating links between images, the links associated with one or more objects, each of the one or more objects being common to at least two of the one or more images;

(b) obtaining a user selection identifying a selected location of a selected image;

(c) calculating by means of one or more computer processors, link weights based on the distance between the selected location of one of the images and the location of at least one of the one or more objects in the selected image, by: (i) using the links between the images associated with the one or more objects in the remaining images of the plurality of images; (ii) interpolating the location of the one or more objects in the remaining images by using the distance between the selected location and one or more secondary objects in the remaining images; and (iii) comparing the distance between the selected location of one of the images and the location of the at least one of the one or more objects in the selected image to the distance between the selected location and the one or more secondary objects that is the same as the at least one or more objects in one or more other images;

(d) ranking the images based upon a ranking mode that utilizes the relative link distances indicated by the calculated link weights whereby images with a higher ranking are more relevant to the user selection; and (e) displaying the images in order by ranking.

10. The method of claim 9 further comprising one or more of the following steps of:

(a) displaying the images with a higher ranking to be larger than images with a lower ranking; and (b) creating one or more tags associated with each of the one or more objects and applying each tag to the one of the one or more objects it is associated with within the at least two images in accordance with the links created between the at least two images.

11. The method of claim 9 further comprising the step of identifying one or more most relevant images and displaying the images with a higher ranking closer to the one or more most relevant images than the images with lesser ranking/object relevance, such that the images radially decrease in relevance.

12. The method of claim 9 further comprising the step of optimizing the display of images to minimize its size.

13. The method of claim 10 further comprising the steps of:

(a) positioning a largest image in a centre of a display; and (b) positioning images in order of decreasing size in a recursive manner about the largest image such that the images do not overlap.

14. A system for searching, sorting and displaying images, the system being operable to connect to one or more remote computers to provide access to the resources of the system at said one or more remote computers, the system comprising:

(a) a server computer;

(b) a server application linked to the server computer, the server application including a ranking utility, the server application being operable to provide instructions to the server computer that:

(i) identify one or more objects within a first image of a plurality of images, the one or more objects each being associated with one of one or more first locations in the first image;

(ii) identify the one or more objects within at least one of the remaining images of the plurality of images to define one or more second images, the one or more objects each being associated with one of one or more second locations in the second images;

(iii) create links between the first location and the one or more second locations, said links defining a link structure between the first image and the second images (iv) select a selected location of a selected image that is one of the plurality of images that identifies a search object via a user interactively accessing the plurality of images to make such selection;

(v) sort the plurality of images by utilizing the selected location as input for a sorting mode operable to: (A) identify the distance between the search object and at least one secondary object in the first image as a first image proximity; (B) use the links between first and second locations to locate associated objects in the remaining images of the plurality of images; (C) interpolate the location of the search object in the remaining images by using the distance between the search object and at least one secondary object in the first image, and the locations of the associated objects in the remaining images of the plurality of images; and (D) sort the plurality of images by a review of relative distances between image objects in the plurality of images based on the first image proximity;

(vi) display the sorted plurality of images.

15. The system of claim 14 wherein server application is further operable to provide one or more of the following instructions to the server computer that:

(a) achieve the sort using an interpolation means;

(b) create links between each corresponding one or more first locations and one or more second location(s), whereby the links define a link structure between the first image and the second images, whereby the links are based on a link structure operable to sort a plurality of images on the basis of a relative distance between each of the one or more first locations and associated objects in the first image, and the one or more second locations and the associated objects in the corresponding images; and (c) creating one or more tags and applying said one or more tags so that the same one of the one or more tags is applied to the one or more first locations and the one or more second locations that correspond to each other in accordance with the link structure.

16. The system of claim 14 wherein the distance is determined by localization and ranking, whereby the localization and ranking is achieved using a graphical representation means, the graphical representation means comprising:

(a) calculating weights based on the second locations, each weight corresponding to each of the second images; and (b) determining an image ranking of the second images based on a sum of the weights.

17. The system of claim 16 wherein a weighted centroid of the second locations is used to determine an object location within a particular image.

18. The system of claim 14 wherein the ranking determines image size for the one or more images of the plurality of images displayed.

19. The system of claim 14 wherein the ranking determines image position for the one or more images of the plurality of images displayed.

20. A computer system adapted to search, sort and display images comprising:

(a) a processor; and (b) a memory, including software instructions that cause the computer system to perform the steps of:

(i) identifying one or more objects within a first image of a plurality of images, the one or more objects each being associated with one of one or more first locations in the first image;

(ii) identifying the one or more objects within at least one of the remaining images of the plurality of images to define second images, the one or more objects each being associated with one of one or more second locations in the second images;

(iii) creating links between the first location and the one or more second locations, said links defining a link structure between the first image and the second images (iv) displaying to a user one or more of the plurality of images;

(v) enabling the user to select a selected location of a selected image of the plurality of images that identifies a search object;

(vi) sorting the plurality of images by utilizing the selected location as input for a sorting mode operable to: (A) identify the distance between the search object and at least one secondary object in the first image as a first image proximity; (B) use the links between first and second locations to locate associated objects in the remaining images of the plurality of images; (C) interpolate the location of the search object in the remaining images by using the distance between the search object and at least one secondary object in the first image, and the locations of the associated objects in the remaining images of the plurality of images; and (D) sort the plurality of images by a review of relative distances between image objects in the plurality of images based on the first image proximity;

(vii) ranking one or more images of the plurality of images according to the sort; and (viii) displaying the sorted images.

21. The computer system of claim 20 wherein the memory includes software instructions that cause the computer system to perform one or more of the steps of:

(a) achieving sorting by using an interpolation means;

(b) creating links between corresponding one or more first locations and one or more second locations, whereby the links define a link structure between the first image and the second images, wherein link structure is operable to sort a plurality of images on the basis of a relative distance between each of the one or more first locations and associated objects in the first image, and the one or more second locations and the associated objects in the corresponding images; and (c) creating one or more tags and applying said one or more tags so that the same one of the one or more tags is applied to the one or more first locations and the one or more second locations that correspond to each other in accordance with the link structure.

22. The computer system of claim 20 wherein the distance is determined by localization and ranking achieved by using a graphical representation means comprising:

(a) calculating weights based on the second locations, each weight corresponding to each of the second images; and (b) determining an image ranking of the second images based on a sum of the weights.

23. The computer system of claim 22 wherein a weighted centroid of one of the one or more second locations is used to determine a location of one of the one or more objects within a particular image.

24. The computer system of claim 20 wherein the ranking determines image size for the one or more images of the plurality of images displayed.

25. The computer system of claim 20 wherein the ranking determines image position for the one or more images of the plurality of images displayed.

26. A computer program product provided on a non-transitory computer readable storage media for enabling a computer to search, sort and/or display images comprising:
   (a) a computer readable medium bearing software instructions; and
   (b) the software instructions for enabling the computer to perform predetermined operations, the predetermined operations including the steps of:
      (i) identifying one or more objects within a first image of a plurality of images, the one or more objects each being associated with one of one or more first locations in the first image;
      (ii) identifying the one or more objects within at least one of the remaining images of the plurality of images to define second images, the one or more objects each being associated with one of one or more second locations in the second images;
      (iii) creating links between the first location and the one or more second locations, said links defining a link structure between the first image and the second images
      (iv) displaying to a user one or more of the plurality of images;
      (v) enabling the user to select a selected location of a selected image of the plurality of images that identifies a search object;
      (vi) sorting the plurality of images by utilizing the selected location as input for a sorting mode operable to: (A) identify the distance between the search object and at least one secondary object in the first image as a first image proximity; (B) use the links between first and second locations to locate associated objects in the remaining images of the plurality of images; (C) interpolate the location of the search object in the remaining images by using the distance between the search object and at least one secondary object in the first image, and the locations of the associated objects in the remaining images of the plurality of images; and (D) sort the plurality of images by a review of relative distances between image objects in the plurality of images based on the first image proximity;
      (vii) generating a ranking for one or more of the plurality of images according to the sort; and
      (viii) displaying one or more images of the plurality of images according to the ranking.

27. The computer program product of claim 26 wherein the predetermined operations further include one of more of the following steps:
   (a) achieving sorting using an interpolation means;
   (b) creating links between each of the corresponding one or more first locations and one or more second locations, whereby the links define a link structure between the first image and the second images, whereby the links are based on a link structure operable to sort a plurality of images on the basis of a relative distance between each of the one or more first locations and associated objects in the first image, and the one or more second locations and the associated objects in the corresponding images; and
   (c) creating one or more tags and applying said one or more tags so that the same one of the one or more tags is applied to the one or more first locations and the one or more second locations that correspond to each other in accordance with the link structure.

28. The computer program product of claim 26 wherein the distance is determined by localization and ranking, whereby the localization and ranking is achieved using a graphical representation means, the graphical representation means comprising:
   (a) calculating weights based on the second locations, each weight corresponding to each of the second images; and
   (b) determining an image ranking of the second images based on a sum of the weights.

29. The computer program product of claim 28 wherein a weighted centroid of the second locations is used to determine an object location within a particular image.

30. The computer program product of claim 26 wherein the ranking determines image size for the one or more images of the plurality of images displayed.

31. The computer program product of claim 26 wherein the ranking determines image position for the one or more images of the plurality of images displayed.

32. The method of claim 1 further comprising the steps of:
   (a) accessing the plurality of images from a database of images;
   (b) identifying one or more additional objects within the first image and creating additional link structures corresponding to one or more of the one or more additional objects; and
   (c) creating an additional tag for each of one or more additional objects that additional link structures are created for, and applying the additional tag to the first location and the second locations in accordance with the link structure; and
   whereby one or more link structures are defined between the first image and the second images, and the links are created corresponding to a plurality of locations associated with a plurality of objects; and
   whereby one or more tags are applied within the plurality of images, so that each of the one or more tags is applied to a group of locations within the plurality of images including the first location and second locations that are linked by the linked structure.

* * * * *